(12) United States Patent
Watanabe et al.

(10) Patent No.: US 8,301,915 B2
(45) Date of Patent: Oct. 30, 2012

(54) SEMICONDUCTOR INTEGRATED CIRCUIT DEVICE AND IC CARD USING THE SAME

(75) Inventors: Kazuki Watanabe, Hino (JP); Nobuaki Yoneya, Takasaki (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 442 days.

(21) Appl. No.: 12/572,298

(22) Filed: Oct. 2, 2009

(65) Prior Publication Data

US 2010/0088534 A1 Apr. 8, 2010

(30) Foreign Application Priority Data

Oct. 2, 2008 (JP) ................................. 2008-256948

(51) Int. Cl.
*G06F 1/26* (2006.01)
(52) U.S. Cl. ........................ 713/300; 713/340
(58) Field of Classification Search .................. 713/300, 713/320, 323, 324, 340
See application file for complete search history.

(56) References Cited

U.S. PATENT DOCUMENTS

| | | | |
|---|---|---|---|
| 5,841,996 A * | 11/1998 | Nolan et al. | 710/305 |
| 6,474,558 B1 * | 11/2002 | Reiner | 235/492 |
| 7,246,750 B2 * | 7/2007 | Cho | 235/492 |
| RE41,304 E * | 5/2010 | Matsuo et al. | 323/266 |
| 2003/0085751 A1 * | 5/2003 | Miyazaki et al. | 327/534 |
| 2003/0230631 A1 | 12/2003 | Tsunoda et al. | |
| 2007/0127185 A1 | 6/2007 | Watanabe | |

FOREIGN PATENT DOCUMENTS

| | | |
|---|---|---|
| JP | 2000-113148 A | 4/2000 |
| JP | 2004-078898 A | 3/2004 |
| JP | 2007-156767 A | 6/2007 |

* cited by examiner

*Primary Examiner* — Paul Yanchus, III
(74) *Attorney, Agent, or Firm* — Miles & Stockbridge P.C.

(57) ABSTRACT

The present invention enables a power-supply voltage terminal and an internal circuit to be isolated from each other in a noncontact operation without largely increasing a chip area in a semiconductor integrated circuit device for an IC card. A semiconductor integrated circuit device comprises: a first power supply circuit for rectifying and smoothing an AC signal supplied from an antenna to an antenna terminal, thereby obtaining a DC voltage in a first power-supply line; a second power supply circuit comprising a voltage control circuit for controlling gate terminal voltage of a first MOS transistor disposed between a power supply terminal to which power is input from the outside and the first power supply line; a substrate potential control circuit for forming source voltage of the first MOS transistor as a substrate voltage; and a second MOS transistor which makes substrate voltage and gate voltage of the first MOS transistor conductive in the case of using the voltage generated by the first power supply circuit as a power supply, and which makes the substrate voltage and the gate voltage nonconductive in the case of using a power supply from an external terminal.

11 Claims, 9 Drawing Sheets

SEMICONDUCTOR INTEGRATED CIRCUIT DEVICE AND IC CARD USING THE SAME

CLAIM OF PRIORITY

The present application claims priority from Japanese patent application JP 2008-256948 filed on Oct. 2, 2008, the content of which is hereby incorporated by reference into this application.

FIELD OF THE INVENTION

The present invention relates to a power supply control technique suitably applied to a semiconductor integrated circuit device or the like mounted on an IC card and, more particularly, to a semiconductor integrated circuit device selectively operated on a power supply voltage generated from an electromagnetic wave received by an antenna provided for an IC card or a power supply voltage supplied from the outside via a contact terminal provided for the IC card, and to an IC card using the semiconductor integrated circuit.

BACKGROUND OF THE INVENTION

A contact-type IC card internally having a semiconductor integrated circuit having the functions of a CPU, a memory, and the like and having, on the surface of the card, a contact terminal with the semiconductor integrated circuit is being widespread in the fields of finance and the like.

In the contact-type IC card, writing, erasure, and reading of data to/from the memory by the CPU or the like are controlled and, by having a cipher processing function and the like, high security performance of the contact-type IC card is realized. In a CPU or the like realizing such a function, device withstand voltage is decreasing due to refinement of the semiconductor process of these days, and the withstand voltage of the power supply voltage supplied to the CPU is suppressed. Consequently, the power supply voltage is commonly supplied to the CPU and the like via a regulator circuit which suppresses the voltage level from the power supply voltage terminal.

On the other hand, a noncontact-type IC card having no power supply such as a battery, generating a power supply voltage for operating internal circuits from electromagnetic waves received by an antenna, and operating on the generated voltage is being actively used in the fields of traffic and the like. A noncontact-type IC card receives data obtained by modulating electromagnetic waves and sent from a reader/writer (interrogator), according to data obtained by processing the received data, modulates the electromagnetic waves received by the antenna by fluctuating the load between the antenna terminals, and transmits the data to the reader/writer (interrogator).

Like the contact-type IC card, also in the noncontact-type IC card, a CPU, a memory, and the like are mounted in order to realize the above-described function. Consequently, a power supply voltage which is suppressed so as not to exceed a withstand voltage of an element as a component of the CPU is supplied to the CPU and the like.

In a dual-way IC card having both the function of a contact-type IC card and the function of a noncontact-type IC card, according to the operation state of the IC card, a power supply voltage which is supplied from a power supply voltage terminal provided as a contact terminal via a regulator circuit or a power supply voltage generated from electromagnetic waves received by an antenna is selectively supplied to an internal circuit such as a CPU mounted internally.

To prevent short-circuit of an input voltage supply which may occur in the case where a plurality of power supply input units are provided and a supplied power is switched and used and to prevent short-circuit between a power supply terminal and a ground terminal which is caused by contact of metal or the like in a noncontact operation, it is necessary to isolate a power supply input other than the selected power supply.

For the purpose, there is a technique of interrupting an input from a power supply voltage terminal in the case of providing a power supply switch circuit between the power supply voltage terminal and an internal power supply line and performing operation on power generated from electromagnetic waves received by an antenna (refer to patent document 1).

In the case of configuring the power supply switch circuit described in the patent document 1 by a PMOS transistor, a current path is generated between the power supply voltage terminal and the internal power supply line via a parasitic diode formed between a bulk terminal of the PMOS transistor and the source terminal. Consequently, the internal power supply line cannot be completely interrupted from the power supply voltage terminal.

There is consequently a technique of completely interrupting the internal power supply line from the power supply voltage terminal without generating the current path via the parasitic diode by configuring the power supply switch circuit by two PMOS transistors which are coupled in series (refer to patent document 2).

Patent Document 1: Japanese Unexamined Patent Publication No. 2000-113148

Patent Document 2: Japanese Unexamined Patent Publication No. 2004-78898

SUMMARY OF THE INVENTION

In the case where the power supply switch circuit is configured by an NMOS transistor as described in the patent document 1, when the power supply voltage supplied from the power supply voltage terminal becomes low, it takes long time until the gate voltage at which the NMOS transistor is sufficiently turned on is generated. Since sufficient voltage is not supplied to the internal power supply line during the period, it becomes difficult to perform a process such as determination of an operation mode and the like, and it takes long time for a chip to start the operation.

Further, to reduce a voltage loss in the power supply switch circuit also in the case where the power supply voltage supplied from the power supply voltage terminal is low, the on resistance of the NMOS transistor has to be reduced by expanding the size of the NMOS transistor or supplying a sufficiently large voltage to the gate terminal of the NMOS transistor. In particular, in the case where the power supply voltage supplied from the power supply voltage terminal is low and power consumption of the internal circuit is large, the influence is large, so that it is difficult to suppress increase in the chip area and the consumption current.

On the other hand, in the case of forming the power supply switch circuit by PMOS transistors as disclosed in the patent document 2, when the power supply voltage supplied from the power supply voltage terminal becomes low, the gate-source voltage of the PMOS transistors forming the power supply switch also becomes low, so that the voltage loss caused by the power supply switch increases largely. Therefore, it is necessary to increase the transistor size in order to reduce the on resistance of the PMOS transistors forming the power supply switch.

Further, the power supply switch circuit disclosed in the patent document 2 has to use two PMOS transistors requiring large transistor size in order to interrupt a current path generated via a parasitic diode formed between the drain and source terminals of the PMOS transistors forming the power supply switch circuit and the substrate terminal. Consequently, to reduce a voltage loss caused by the power supply switch circuit in the case where the power supply voltage supplied from the power supply voltage terminal is low, it is necessary to largely increase the size of the PMOS transistor. It is therefore difficult to suppress increase in the chip area.

An object of the present invention is to provide a circuit technique realizing a function of isolating a power supply voltage terminal and an internal circuit from each other in a noncontact operation without largely increasing the chip area, and capable of supplying a voltage supplied from the power supply voltage terminal to an internal circuit without losing the voltage in the contact operation.

The above and other objects and novel features of the present invention will become apparent from the description of the specification and the appended drawings.

Outline of representative inventions disclosed in the present application will be briefly described as follows.

A semiconductor integrated circuit device comprises: a first power supply circuit for rectifying and smoothing an AC signal supplied from an antenna to an antenna terminal, thereby obtaining a DC voltage in a first power supply line; a second power supply circuit having a voltage control circuit for controlling gate terminal voltage of a first MOS transistor disposed between a power supply terminal to which power is input from the outside and the first power supply line; and a substrate potential control circuit for forming source voltage of the first MOS transistor as a substrate voltage. In the case of using the voltage generated by the first power supply circuit as a power supply, for example, substrate voltage and gate voltage of the first MOS transistor are made equal to the source voltage to interrupt the first MOS transistor, thereby isolating the power supply terminal and the first power supply line from each other. In the case of using a power supply from an external terminal, the voltage from the power supply terminal is suppressed to a predetermined voltage by mutual conductance control of the first MOS transistor, and the resultant voltage is output to the first power supply line.

An effect obtained by the representative ones of the inventions disclosed in the application will be briefly described as follows.

That is, without adding a large transistor for forming a power supply switch circuit between an external terminal for a power supply and a power supply line on the inside, the power supply voltage terminal and the internal power supply line can be isolated from each other in a noncontact operation.

1. Outline of Embodiment

First, outline of representative embodiments of the present invention disclosed in the application will be described. Reference numerals in parentheses in the diagrams referred to in the outline explanation of the representative embodiments just illustrate components included in the concept of the components.

(1) A semiconductor integrated circuit device according to the present invention comprises: an antenna terminal coupled to an antenna; a first power supply circuit (U3) for rectifying and smoothing an AC signal supplied from the antenna to the antenna terminal, thereby obtaining a DC voltage in a first power supply line; a power supply terminal (VDD) and a ground terminal (VSS) to which power is supplied from the outside; a second power supply circuit comprising a first MOS transistor (M1) disposed between the power supply terminal and the first power supply line and a voltage control circuit (B2) for controlling a voltage of a gate terminal of the first MOS transistor; and a substrate potential control circuit (B1) for controlling substrate voltage of the first MOS transistor. In the case of using the voltage generated by the first power supply circuit as a power supply, the first MOS transistor is interrupted, thereby isolating the power supply terminal and the first power supply line from each other. In the case of using a power supply from an external terminal, the power supply control circuit controls the first MOS transistor to suppress voltages supplied from the power supply terminal and the ground terminal to a predetermined voltage and outputs the resultant voltage to the first power supply line.

(2) The semiconductor integrated circuit device of (1) further comprises a second MOS transistor (M2) which makes substrate voltage and gate voltage of the first MOS transistor conductive in the case of using the voltage generated by the first power supply circuit as a power supply, and which makes the substrate voltage and the gate voltage nonconductive in the case of using a power supply from an external terminal.

(3) In the semiconductor integrated circuit device of (2), the substrate potential control circuit outputs the voltage of the first power supply line as the substrate voltage in a state where the first MOS transistor is interrupted, and outputs the voltage of the first power supply terminal as the substrate voltage in a state where the first MOS transistor is not interrupted.

(4) In the semiconductor integrated circuit device of (3), the substrate potential control circuit comprises: a third MOS transistor (M3) disposed between the output terminal of the substrate voltage and the power supply voltage; a fourth MOS transistor (M4) disposed between the output terminal of the substrate voltage and the first power supply line; and a gate voltage control circuit (B4) for controlling a gate terminal voltage of the third and fourth MOS transistors. The gate voltage control circuit controls the substrate voltage of the first MOS transistor to be the same potential as the potential of the source terminal of the first MOS transistor by turning on the third MOS transistor when the potential of the power supply terminal is higher than that of the first power supply line, and turning on the fourth MOS transistor when the potential of the power supply terminal is lower than the potential of the first power supply line.

(5) In the semiconductor integrated circuit of (4), the third and fourth MOS transistors are P-channel-type MOS transistors in each of which a substrate has the same potential as that of an output terminal of the substrate voltage. The gate voltage control circuit comprises a wire for coupling the gate of the third MOS transistor to the first power supply line, and a wire for coupling the gate of the fourth MOS transistor to the power supply terminal.

(6) The semiconductor integrated circuit device of (1) may further comprise a pull-down circuit (B5) between the power supply terminal and the ground terminal. The pull-down circuit decreases a resistance value between the power supply terminal and the ground terminal on the basis of detection by the detection circuit, of formation of a power supply based on the AC signal.

(7) In the semiconductor integrated circuit device of (1), the detection circuit operates on voltage (VDDH) input to the substrate terminal of the first MOS transistor as a power supply voltage.

(8) The semiconductor integrated circuit device of (1) may further comprise an internal circuit (U6) which operates on voltage supplied to the first power supply line as a power supply voltage.

(9) An IC card according to the present invention comprises: a coil forming an antenna; a plurality of metal terminals forming a coupling terminal; and the semiconductor integrated circuit device of (1). The antenna terminal of the semiconductor integrated circuit device is coupled to the coil, and a power supply terminal and a ground terminal of the semiconductor integrated circuit device are coupled to a predetermined metal terminal.

(10) A semiconductor integrated circuit device according to another aspect of the present invention comprises: a first power supply circuit (U3) for rectifying and smoothing an AC signal supplied from an antenna to an antenna terminal, thereby obtaining a DC voltage in a first power supply line (VDDA); a second power supply circuit having a voltage control circuit (B2) for controlling gate terminal voltage of a first MOS transistor (M1) disposed between a power supply terminal (VDD) to which power is input from the outside and the first power supply line; a substrate potential control circuit (B1) for forming source voltage of the first MOS transistor as a substrate voltage; and a second MOS transistor which makes substrate voltage and gate voltage of the first MOS transistor conductive in the case of using the voltage generated by the first power supply circuit as a power supply, and which makes the substrate voltage and the gate voltage nonconductive in the case of using a power supply from an external terminal.

(11) In the semiconductor integrated circuit device of (10), the substrate potential control circuit outputs the voltage of the first power supply line as the substrate voltage in a state where the first MOS transistor is interrupted, and outputs the voltage of the first power supply terminal as the substrate voltage in a state where the first MOS transistor is not interrupted.

(12) In the semiconductor integrated circuit device of (11), the substrate potential control circuit comprises: a third MOS transistor disposed between the output terminal of the substrate voltage and the power supply voltage; a fourth MOS transistor disposed between the output terminal of the substrate voltage and the first power supply line; and a gate voltage control circuit for controlling a gate terminal voltage of the third and fourth MOS transistors. The gate voltage control circuit controls the substrate voltage of the first MOS transistor to be the same potential as the potential of the source terminal of the first MOS transistor by turning on the third MOS transistor when the potential of the power supply terminal is higher than that of the first power supply line, and turning on the fourth MOS transistor when the potential of the power supply terminal is lower than the potential of the first power supply line.

(13) In the semiconductor integrated circuit device of (12), the third and fourth MOS transistors are P-channel-type MOS transistors in each of which a substrate has the same potential as that of an output terminal of the substrate voltage. The gate voltage control circuit comprises a wire for coupling the gate of the third MOS transistor to the first power supply line, and a wire for coupling the gate of the fourth MOS transistor to the power supply terminal.

(14) An IC card according to the present invention comprises: a coil forming an antenna; a plurality of metal terminals forming a coupling terminal; and the semiconductor integrated circuit device of (10). An antenna terminal of the semiconductor integrated circuit device is coupled to the coil, and a power supply terminal and a ground terminal of the semiconductor integrated circuit device are coupled to a predetermined metal terminal.

DETAILED DESCRIPTION OF THE PREFERRED EMBODIMENTS

Embodiments of the present invention will be described more specifically.

<<First Embodiment>>

Figure 1:
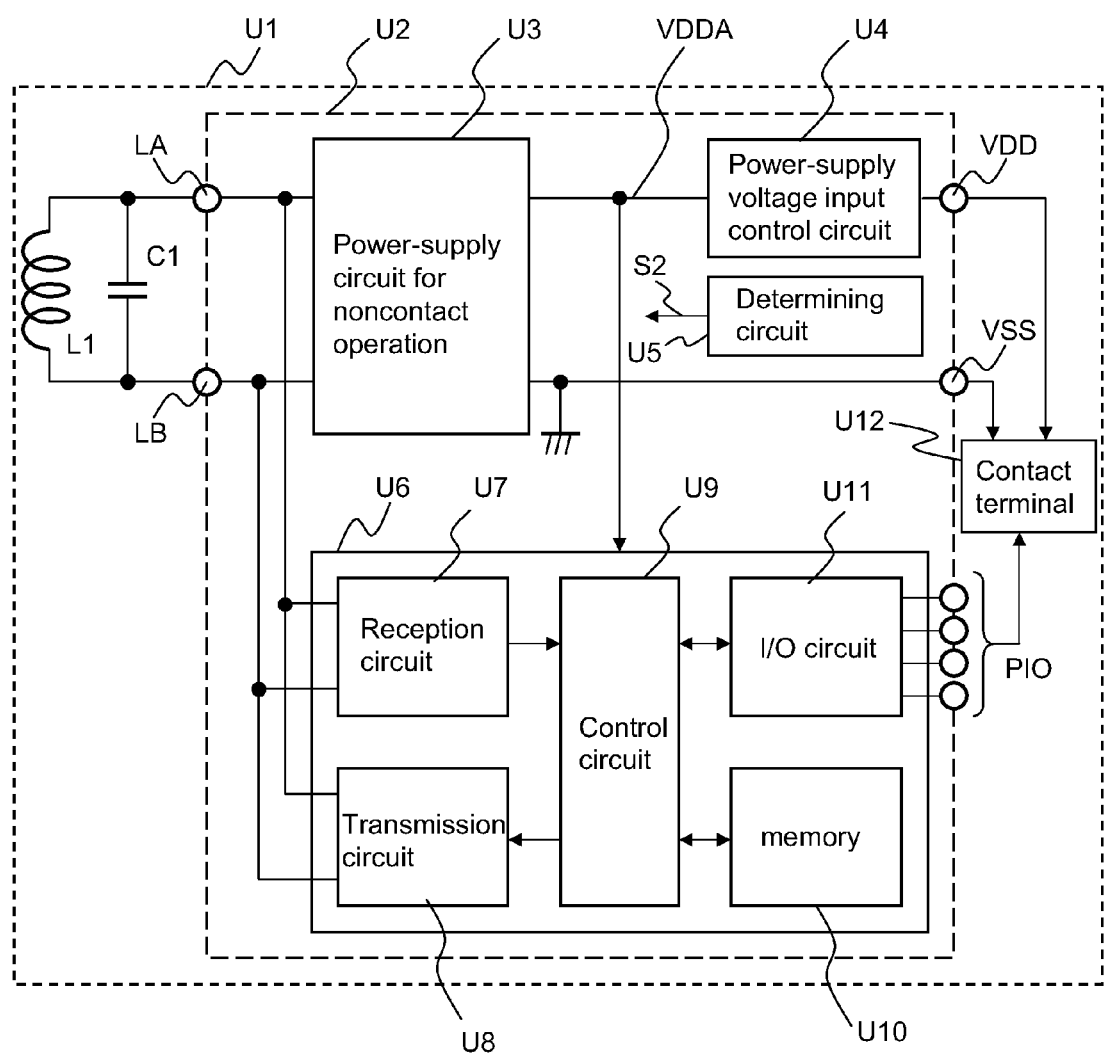
FIG. 1 is a basic configuration diagram of a first embodiment of a semiconductor integrated circuit device and an IC card of the present invention.

FIG. 1 is a block diagram of a basic configuration illustrating a first embodiment of a semiconductor integrated circuit device and an IC card of the present invention.

In FIG. 1, U1 denotes an IC card, U2 denotes a semiconductor integrated circuit device mounted on the IC card U1, and L1 indicates an antenna mounted on the IC card U1. A capacitor CA coupled to the antenna L1 in parallel is a component of a resonant circuit. The resonant capacitor CA is adjusted also in consideration of a parasitic capacitor and the like, so that it is not always coupled. The semiconductor integrated circuit U2 has a power supply circuit U3 for non-contact operation, a power-supply voltage terminal input control circuit U4, a contact/noncontact determining circuit U5, and an internal circuit U6 and also has antenna terminals LA and LB for coupling the antenna L1, a power-supply voltage terminal VDD, a ground terminal VSS, and signal input/output terminals PIO coupled to an external contact terminal U12.

Figure 2:
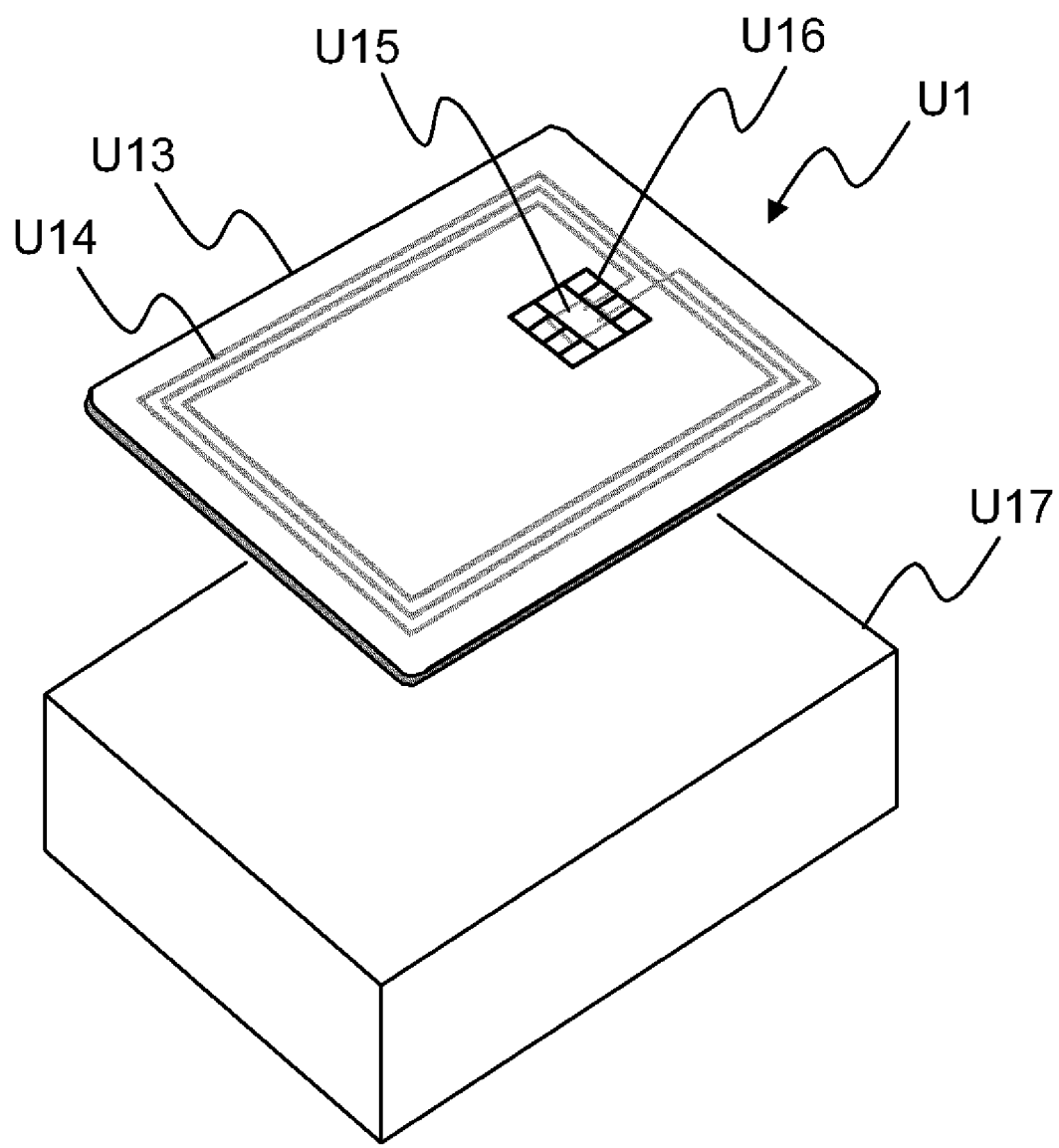
FIG. 2 is a perspective view of a wiring board and a reader/writer of an IC card having an antenna and the semiconductor integrated circuit device of the present invention.

FIG. 2 shows the structure of the IC card U1. The IC card U1 has a form of a card by a printed board U13 which is resin molded. The antenna L1 which receives electromagnetic waves from an external reader/writer U17 is configured by a spiral coil U14 formed by a wire of the printed board U13. The contact terminal U12 to the outside is configured by a plurality of metal terminals U16 formed separately on the surface of the IC card U1. In the semiconductor integrated circuit device U2 configured by a single IC chip U15, the coil U14 serving as an antenna and the metal terminals U16 are coupled to the IC chip U15. The antenna L1 which received the electromagnetic waves from the reader/writer U17 outputs a high-frequency AC signal to the antenna terminals LA and LB. The AC signal is partially modulated by an information signal (data).

Although not limited, the semiconductor integrated circuit device U2 is formed on a single semiconductor substrate made of single-crystal silicon by a known semiconductor integrated circuit device manufacturing technique.

In FIG. 1, a power supply circuit U3 for noncontact operation is configured by a rectifier circuit and a smoothing capacitor. Obviously, a regulator function for executing a control so that voltage output from the power-supply circuit 3 does not exceed a predetermined voltage level may be provided.

The output voltage of the power-supply circuit 3 for noncontact operation and the power-supply voltage supplied from a power-supply terminal VDD via a power-supply voltage input control circuit U4 are supplied to an internal power-supply line VDDA and used as power-supply voltage of an internal circuit U6.

A contact/noncontact determining circuit U5 determines whether the card is in a state (contact mode) where the card operates by using the contact terminal U12 or a state (noncontact mode) where the card operates using the antenna L1 by detecting the power supply source, and outputs a determination signal S2. As the contact/noncontact determining circuit U5, a circuit which determines the contact mode when power is not supplied from the antenna L1, or a circuit which determines the contact mode when power is supplied from the contact terminal U12 may be used.

The operation state of the power-supply voltage input control circuit U4 is controlled by an output signal S2 of the contact/noncontact determining circuit U5. At the time of operation in the contact mode, the power-supply voltage input control circuit U4 operates as a so-called regulator circuit which suppresses the power-supply voltage input to the power-supply voltage terminal VDD to a predetermined voltage value and supplies the resultant to the internal power-supply line VDDA. At the time of operation in the noncontact mode, the power-supply voltage input control circuit U4 isolates the power-supply voltage terminal VDD and the internal power-supply line VDDA.

The internal circuit 6 comprises a reception circuit U7, a transmission circuit U8, a control circuit U9, a memory U10, and an I/O circuit U11. The reception circuit U7 demodulates an information signal multiplexed on an AC signal received by the antenna L1 provided for the IC card and supplies the demodulated signal as a digital information signal to the control circuit U9. The transmission circuit U8 receives the digital information signal output from the control circuit U9 and modulates the AC signal received by the antenna L1 with the information signal. In response to a change in reflection of the electromagnetic wave from the antenna L1 caused by the modulation, the reader/writer U17 receives an information signal from the control circuit U9. The memory U10 is used for, for example, recording of the demodulated information data and transmission data from the control circuit U9.

Further, the control circuit U9 can also transmit/receive a signal to/from an external device via the I/O circuit U11 and a signal input/output terminal PIO. When a signal is transmitted/received via the signal input/output terminal PIO, the internal circuit U6 operates using the power supply voltage supplied from the power-supply voltage terminal VDD and the ground terminal VSS.

Figure 3:
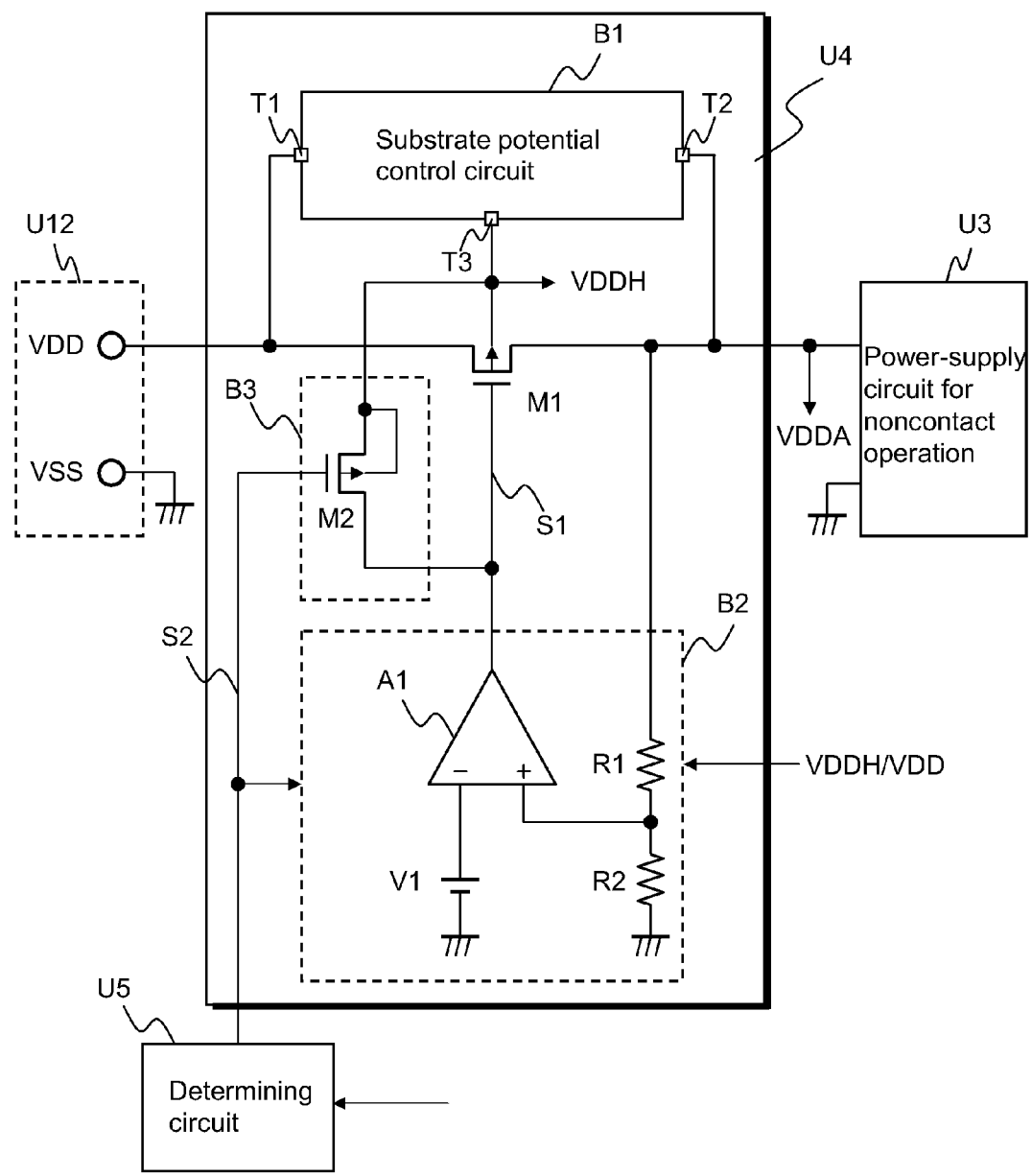
FIG. 3 is a basic configuration diagram of a power-supply voltage input control circuit mounted on the semiconductor integrated circuit device of the first embodiment.

FIG. 3 is a basic configuration diagram of the power-supply voltage input control circuit U4 mounted on the semiconductor integrated circuit device of the first embodiment. To make explanation clear, the noncontact power-supply circuit U3, the contact/noncontact determining circuit U5, and the power-supply voltage terminal VDD and the ground terminal VSS forming the contact terminal U12 related to peripheral circuits of the power-supply voltage input control circuit U4 are shown.

In FIG. 3, a P-channel-type MOS transistor (hereinbelow, also simply described as PMOS transistor) M1 is coupled between the power-supply voltage terminal VDD and the internal power-supply line VDDA. To the substrate voltage of the PMOS transistor M1, a voltage line VDDH to which output voltage of a substrate potential control circuit B1 is supplied is coupled. To the gate terminal of the PMOS transistor M1, a control signal S1 generated by a voltage control circuit B2 and a pull-up circuit B3 is input.

The voltage control circuit B2 is configured by the following circuits. Voltage-dividing resistors R1 and R2 are provided between the internal power-supply line VDDA and a ground terminal VSS. A divided voltage obtained at the coupling point between the voltage-dividing resistors R1 and R2 is supplied to a non-inversion input (+) of an operating amplifier A1. A reference voltage supply V1 is coupled between an inversion input (−) of the operating amplifier A1 and the ground terminal VSS. The operation/non-operation of the voltage control circuit B2 is controlled by a determination signal S2 output from the contact/noncontact determining circuit U5. For example, the operation is permitted in an operation in the contact mode instructed by the high level of the signal S2. The operation is stopped in an operation in the noncontact mode instructed by the low level of the signal S2. The operation power supply of the voltage control circuit B2 is VDD or VDDH. The operation power supply of the voltage control circuit B2 may take a form that when the signal S2 is at the high level, the power from VDD or VDDH is supplied to the voltage control circuit B2 via a not-shown power switch.

With the configuration, only in an operation in the contact mode, the voltage control circuit B2 generates a voltage proportional to the difference between the divided voltage obtained at the coupling point between the voltage-dividing resistors R1 and R2 and the output voltage of the reference voltage supply V1, and outputs the voltage as the control signal S1. The mutual conductance of the PMOS transistor M1 which receives the signal S1 is controlled so that the voltage divided by the resistors R1 and R2 becomes the reference voltage V1, and the PMOS transistor M1 operates as a regulator.

A pull-up circuit B3 is configured by a PMOS transistor M2, and is on/off controlled by the determination signal S2 output from the contact/noncontact determining circuit U5. In an operation in the contact mode which is instructed by the high level of the signal S2, the PMOS transistor M2 is turned off. In an operation in the noncontact mode which is instructed by the low level of the signal S2, the PMOS transistor M2 is turned on. When the PMOS transistor M2 is in the on state, the PMOS transistor M1 is turned off.

The power-supply voltage terminal VDD is coupled to an input terminal T1 of the substrate potential control circuit B1, the internal power-supply line VDDA is coupled to the input terminal T2, and the power-supply line VDDH is coupled to the output terminal T3.

Figure 4:
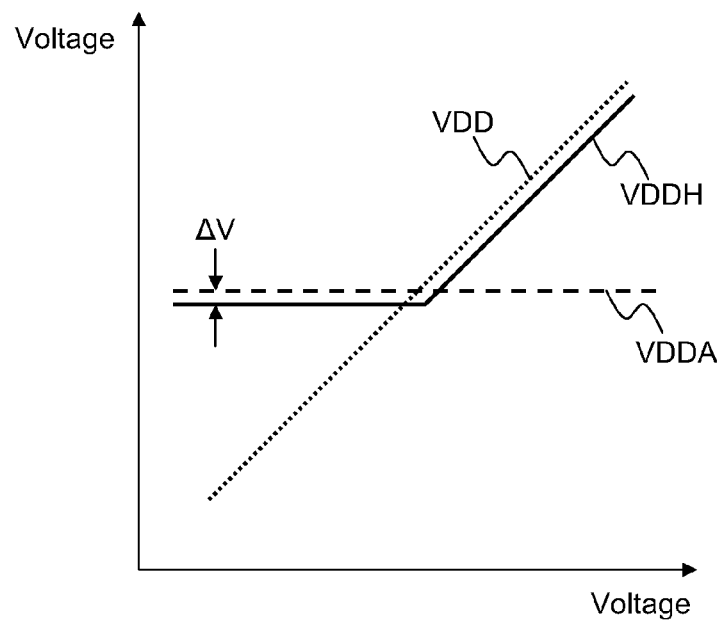
FIG. 4 is a characteristic diagram showing an example of an input/output characteristic of a substrate potential control circuit B1 as a component of the power-supply voltage input control circuit U4 mounted on the semiconductor integrated circuit device of the first embodiment.

FIG. 4 shows an example of the input/output characteristic of the substrate potential control circuit B1 as a component of the power-supply voltage input control circuit U4 mounted on the semiconductor integrated circuit device of the first embodiment. To simplify explanation, the diagram shows a voltage change in the voltage line VDDH in the case where the voltage of the power-supply voltage terminal VDD changes on assumption that the voltage of the power supply line VDDA is constant.

As shown in FIG. 4, the substrate potential control circuit B1 is a circuit having the function of comparing the voltage level of the power-supply voltage terminal VDD coupled to the input terminal T1 with the power-supply line VDDA coupled to the input terminal T2, and outputting a voltage signal having a higher voltage level to the voltage line VDDH.

With the function, in the contact mode in which the PMOS transistor M1 is in the on state, the substrate potential control circuit B1 supplies a voltage having the same level as that of the source terminal to the substrate terminal of the PMOS transistor M1. The potentials at both ends of a parasitic diode formed between the substrate terminal and the source terminal of the PMOS transistor M1 are equalized, and a reverse bias is always applied to a parasitic diode formed between the substrate terminal and the drain terminal of the PMOS transistor M1, so that a current path is not formed between the power-supply voltage terminal VDD and the internal power-supply line VDDA, and the internal power-supply line VDDA can be completely interrupted from the power-supply voltage terminal VDD.

The determining function of the determining circuit U5 will be supplementarily described. In the no-power state, the internal nodes of the power-supply voltage input control circuit U4 and the determining circuit U5 are converged to the low level, and all of the signals S1, S2, and the internal voltages VDDH and VDDA are set to the low level. For example, when VDDH is at the low level, the determining circuit U5 detects the high level of VDD once, inverts the level of S2 to the high level, and maintains the state. When VDD is at the low level, the determining circuit U5 detects the high level of VDDA once, and maintains S2 in the low level. The determining circuit U5 may take a form of, in the case where supply of power from the antenna terminal cannot be detected, inverting the level of S2 to the high level and maintaining the state and, when supply of power from the antenna terminal is detected, maintains S2 in the low level. In any of the cases, by using UDDH as the operation power supply of the determining circuit U5, power is supplied to the determining circuit U5, and stable determining operation can be performed.

In the circuit configuration shown in FIG. 3, the operations in the parts in the state of operation using the contact terminal U12 (contact mode) are as follows.

In the case where voltage is applied across the power-supply voltage terminal VDD and the ground terminal VSS forming the contact terminal U12, and electromagnetic waves from the outside are not supplied to the antenna L1, the contact/noncontact determining circuit U5 determines the contact mode, sets the determination signal S2 to the high level, and outputs the resultant signal.

The determination signal S2 is input to the pull-up circuit B3 and the voltage control circuit B2, the PMOS transistor M2 as a component of the pull-up circuit B3 is turned off, and the voltage control circuit B2 is controlled to operate. Consequently, the control signal S1 generated by the voltage control circuit B2 is supplied to the gate terminal of the PMOS transistor M1.

By the operation, in an operation in the contact mode, the PMOS transistor M2 and the voltage control circuit B2 operate as a regulator circuit for suppressing the voltage of the internal power-supply line VDDA to a predetermined voltage value. Since the potential of the internal power-supply line VDDA becomes lower than that of the power-supply voltage terminal VDD, the potential at the substrate terminal of the PMOS transistor M1 is controlled to be the same as that of the power-supply voltage terminal VDD by the substrate potential control circuit B1.

In the circuit configuration shown in FIG. 3, the operations of the parts in the state of operation using the antenna L1 (noncontact mode) are as follows.

In the case where no voltage is applied across the power-supply voltage terminal VDD and the ground terminal VSS forming the contact terminal U12 and electromagnetic waves from the outside are supplied to the antenna L1, the contact/noncontact determining circuit U5 determines the noncontact mode, sets the determination signal S2 to the low level, and outputs the resultant signal.

The determination signal S2 is input to the pull-up circuit B3 and the voltage control circuit B2 to stop the voltage control circuit B2 and turn on the PMOS transistor M2 configuring the pull-up circuit B3. Consequently, the potential of the gate terminal of the PMOS transistor M1 is controlled to be the same as that of the voltage line VDDH.

By the operation, in an operation in the noncontact mode, the off state of the PMOS transistor M1 is maintained. Therefore, the power-supply voltage terminal VDD and the internal power-supply line VDDA are completely isolated from each other.

Consequently, even when a voltage is applied across the power-supply voltage terminal VDD and the ground terminal VSS in the operation in the noncontact mode, regardless of the magnitude relation between the potential of the power-supply voltage terminal VDD and the potential of the internal power-supply line VDDA, while maintaining the state where the potential of the gate terminal and the potential of the substrate terminal of the PMOS transistor M1 are equal to each other, the potential is maintained equal to the potential of the source terminal of the PMOS transistor M1. Therefore, the PMOS transistor M1 maintains the off state, and the state where the power-supply voltage terminal VDD and the internal power-supply line VDDA are completely isolated from each other can be maintained.

As described above, by maintaining the substrate potential of the PMOS transistor M1 configuring the regulator circuit in the optimum state by the substrate potential control circuit B1 and switching the method of controlling the gate voltage of the PMOS transistor M1 in the operations in the contact mode and the noncontact mode, the PMOS transistor M1 is operated as a transistor for suppressing voltage as a component of the regulator circuit in the operation in the contact mode, thereby supplying a predetermined voltage to the internal power-supply line VDDA. In the operations in the noncontact mode, the PMOS transistor M1 can be operated as a switch transistor for isolating the power-supply voltage terminal VDD and the internal power-supply line VDDA.

With the configuration, as described above, the transistor as a component of the regulator circuit which is generally mounted can be used as the switch transistor realizing power supply isolation. Therefore, the transistor for isolation becomes unnecessary between the power-supply voltage terminal VDD and the internal power-supply line VDDA, so that increase in the chip area can be suppressed very much.

Figure 5:
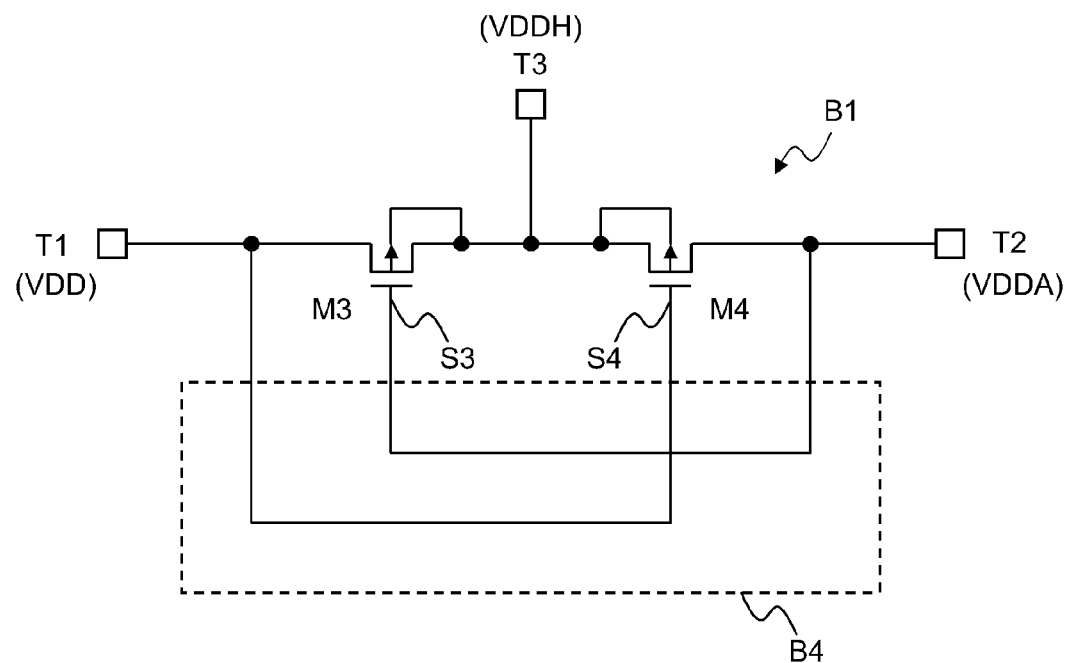
FIG. 5 is a circuit configuration diagram showing an example of a concrete configuration of a substrate potential control circuit B1 mounted on the semiconductor integrated circuit device of the first embodiment.

FIG. 5 is a circuit configuration diagram showing an example of a concrete configuration of the substrate potential control circuit B1 mounted on the semiconductor integrated circuit device of the first embodiment.

The substrate potential control circuit B1 shown in FIG. 5 is configured by PMOS transistors M3 and M4 whose substrate terminals are coupled to an output terminal T3, and a gate terminal control circuit B4 for controlling gate terminals of the PMOS transistors M3 and M4. The PMOS transistor M3 having the gate terminal to which a control signal S3 is input and the PMOS transistor M4 having the gate terminal to which a control signal S4 is input are coupled in series between the input terminal T1 and an input terminal T2. The coupling point between the PMOS transistors M3 and M4 is set as the output coupling terminal T3. The gate terminal control circuit B4 outputs the control signal S4 to the input terminal T1 and outputs the control signal S3 to the input terminal T2.

In the substrate potential control circuit B1 having the above-described circuit configuration, in the power-supply voltage input control circuit U4 shown in FIG. 3, the power-supply voltage terminal VDD is coupled to the input terminal T1, the internal power-supply line VDDA is coupled to the input terminal T2, and the voltage line VDDH is coupled to the output terminal T3.

If the potential of the power-supply voltage terminal VDD is higher than that of the internal power-supply line VDDA, the PMOS transistor M3 is turned on and the PMOS transistor M4 is turned off. Consequently, the output terminal T3 is short-circuited to the input terminal T1, and the voltage line VDDH is controlled to have the same potential as that at the power-supply voltage terminal VDD.

On the contrary, if the potential of the power-supply voltage terminal VDD is lower than that of the internal power-supply line VDDA, the PMOS transistor M3 is turned off, and the PMOS transistor M4 is turned on. Consequently, the output terminal T3 is short-circuited to the input terminal T2, and the voltage line VDDH is controlled to have the same potential as that of the internal power-supply line VDDA.

As a result, the substrate potential control circuit B1 can obtain the input/output characteristic shown in FIG. 4 with the simple configuration of only the two PMOS transistors M3 and M4. Since steadily flowing current is extremely small, the transistor size can be suppressed to be small.

When the threshold voltage of the PMOS transistors M3 and M4 becomes negative voltage, regardless of the potential relation between the power-supply voltage terminal VDD and the internal power-supply line, a condition that both of the PMOS transistors M3 and M4 are turned on occurs. It is consequently preferable that the threshold voltage of the PMOS transistors M3 and M4 is a positive voltage.

Figure 6:
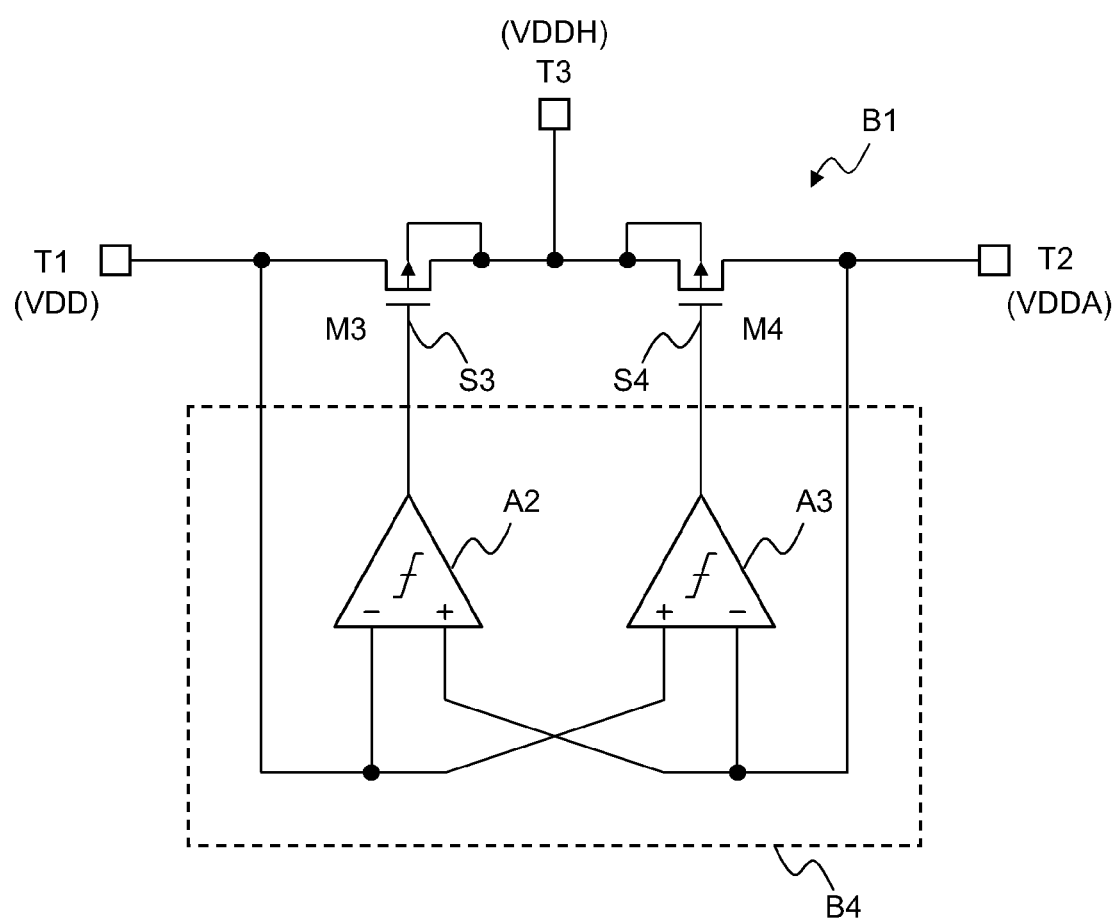
FIG. 6 is a circuit configuration diagram showing another concrete configuration of the substrate potential control circuit B1 mounted on the semiconductor integrated circuit device of the first embodiment.

FIG. 6 is a circuit configuration diagram showing another concrete configuration of the substrate potential control circuit B1 mounted on the semiconductor integrated circuit device of the first embodiment.

The substrate potential control circuit B1 shown in FIG. 6 is configured by the PMOS transistors M3 and M4 whose substrate terminals are coupled to the output terminal T3, and the gate terminal control circuit B4 for controlling the gate terminals of the PMOS transistors M3 and M4. The PMOS transistor M3 having the gate terminal to which the control signal S3 is input and the PMOS transistor M4 having the gate terminal to which the control signal S4 is input are coupled in series between the input terminals T1 and T2, and the coupling point between the PMOS transistors M3 and M4 is set as the output terminal T3. The gate terminal control circuit B4 is configured by voltage comparators A2 and A3. The voltage comparator A2 outputs "L" as the control signal S3 when the potential of the input terminal T1 is higher than that of the input terminal T2, and outputs "H" as the control signal S3 when the potential of the input terminal T1 is lower than that of the input terminal T2. The voltage comparator A3 outputs "H" as the control signal S4 when the potential of the input terminal T1 is higher than that of the input terminal T2, and outputs "L" as the control signal S4 when the potential of the input terminal T1 is lower than that of the input terminal T2.

In the substrate potential control circuit B1 having the above-described circuit configuration, in the power-supply voltage input control circuit U4 illustrated in FIG. 3, the power-supply voltage terminal VDD is coupled to the input terminal T1, the internal power-supply line VDDA is coupled to the input terminal T2, and the voltage line VDDH is coupled to the output terminal T3.

When the potential of the power-supply voltage terminal VDD is higher than that of the internal power-supply line VDDA, the voltage comparator A2 outputs "L" as the control signal S3, and the voltage comparator A3 outputs "H" as the control signal S4. Accordingly, the PMOS transistor M3 is turned on, and the PMOS transistor M4 is turned off, so that the output terminal T3 is short-circuited to the input terminal T1, and the potential of the voltage line VDDH is controlled to be the same as that of the power-supply voltage terminal VDD.

On the contrary, when the potential of the power-supply voltage terminal VDD is lower than that of the internal power-supply line VDDA, the voltage comparator A2 outputs "H" as the control signal S3, and the voltage comparator A3 outputs "H" as the control signal S4. Accordingly, the PMOS transistor M3 is turned off, and the PMOS transistor M4 is turned on, so that the output terminal T3 is short-circuited to the input terminal T2, and the potential of the voltage line VDDH is controlled to be the same as that of the internal power-supply line VDDA.

As a result, the substrate potential control circuit B1 can obtain the input/output characteristics shown in FIG. 4. Since the control signals S3 and S4 are generated by the voltage comparators A2 and A3, even in the case where the potential difference between the power-supply voltage terminal VDD and the internal power-supply line VDDA is small, the PMOS transistors M3 and M4 can be reliably controlled to be turned on/off, and operation can be performed so as to follow potential fluctuations in the power-supply voltage terminal VDD and the internal power-supply line VDDA.

Figure 7:
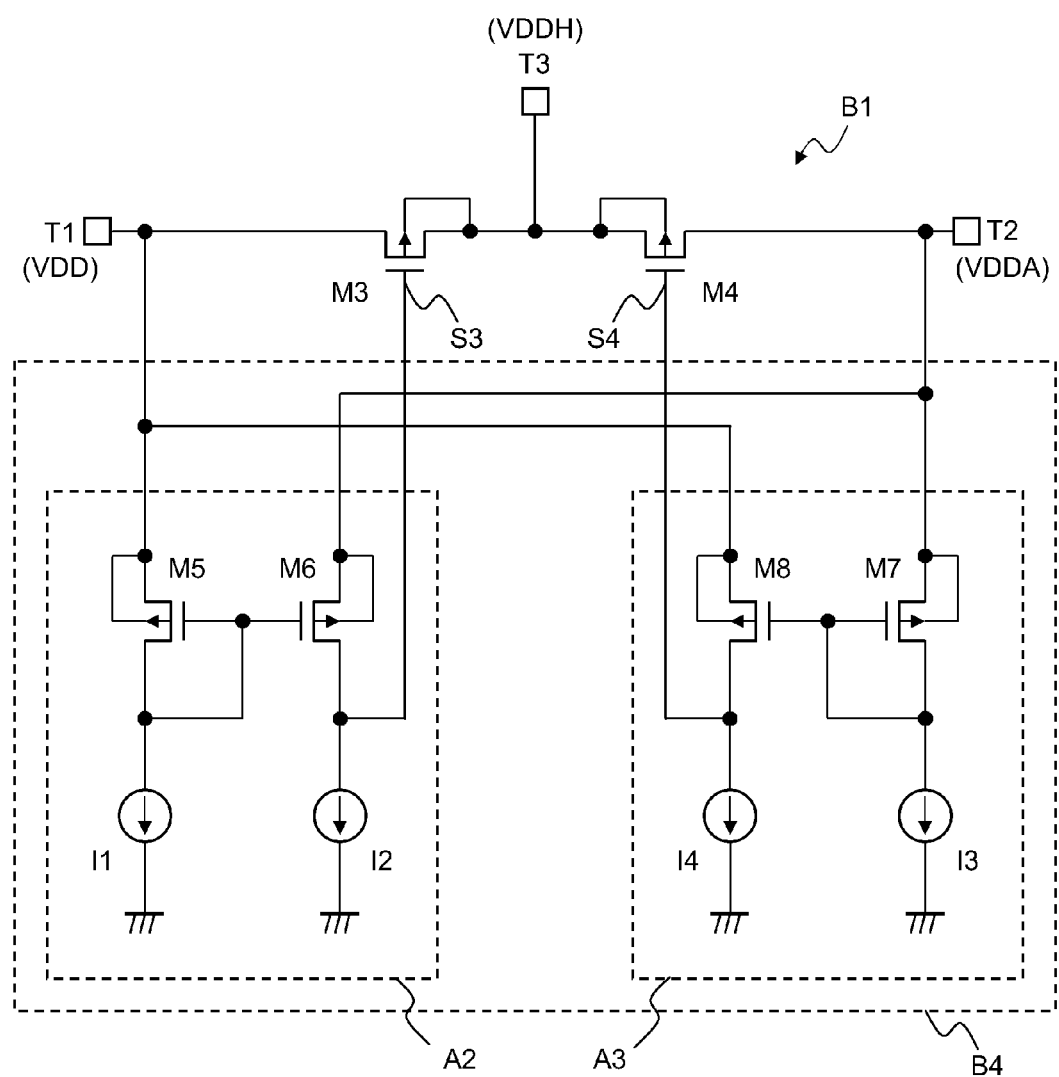
FIG. 7 is a circuit configuration diagram showing another concrete configuration of the substrate potential control circuit B1 mounted on the semiconductor integrated circuit device of the first embodiment.

FIG. 7 is a circuit configuration diagram showing another concrete configuration of the substrate potential control circuit B1 mounted on the semiconductor integrated circuit device of the first embodiment.

The substrate potential control circuit B1 shown in FIG. 7 is configured by the PMOS transistors M3 and M4 whose substrate terminals are coupled to the output terminal T3, and the gate terminal control circuit B4 for controlling the gate terminals of the PMOS transistors M3 and M4. The PMOS transistor M3 having the gate terminal to which the control signal S3 is input and the PMOS transistor M4 having the gate terminal to which the control signal S4 is input are coupled in series between the input terminals T1 and T2, and the coupling point between the PMOS transistors M3 and M4 is set as the output terminal T3. The gate terminal control circuit B4 is configured by the voltage comparators A2 and A3. The voltage comparator A2 is configured by PMOS transistors M5 and M6 and current supplies I1 and I2. Between the input terminal T1 and the ground potential, the PMOS transistor M5 whose source terminal and substrate terminal are coupled and the current supply I1 are coupled in series. Between the input terminal T2 and the ground potential, the PMOS transistor M6 whose source terminal and substrate terminal are coupled and the current supply I2 are coupled in series. The gate terminals of the PMOS transistors M5 and M6 are coupled to the coupling point between the PMOS transistor M5 and the current supply I1, and a voltage signal generated at the coupling point between the PMOS transistor M6 and the current supply I2 is output as the control signal S3. The voltage comparator A3 is configured by PMOS transistors M7 and M8 and current supplies I3 and I4. Between the input terminal T2 and the ground potential, the PMOS transistor M7 whose source terminal and substrate terminal are coupled and the current supply I3 are coupled in series. Between the input terminal T1 and the ground potential, the PMOS transistor M8 whose source terminal and substrate terminal are coupled and the current supply I4 are coupled in series. The gate terminals of the PMOS transistors M7 and M8 are coupled to the coupling point between the PMOS transistor M7 and the current supply I3, and a voltage signal generated at the coupling point between the PMOS transistor M8 and the current supply I4 is output as the control signal S4.

In the substrate potential control circuit B1 having the above-described circuit configuration, in the power-supply voltage input control circuit U4 illustrated in FIG. 3, the power-supply voltage terminal VDD is coupled to the input terminal T1, the internal power-supply line VDDA is coupled to the input terminal T2, and the voltage line VDDH is coupled to the output terminal T3.

In the following, to simplify explanation of the operation of the substrate potential control circuit B1 shown in FIG. 7, it is assumed that the transistor sizes of the PMOS transistors M5 to M8 are the same, and the current values of the current supplies I1 to I4 are equal to each other.

When the potential of the power-supply voltage terminal VDD is higher than that of the internal power-supply line VDDA, in the voltage comparator A2, the gate potentials of the PMOS transistors M5 and M6 are equal to each other, and the gate potentials are controlled to a potential at which the PMOS transistor M5 can pass current supplied from the current supply I1. Therefore, a gate-source voltage of the PMOS transistor M6 becomes smaller than that of the PMOS transistor M5, and the potential at the coupling point of the PMOS transistor M6 and the current source I2 drops and, later, becomes almost the same as the ground potential.

On the other hand, in the voltage comparator A3, the gate potentials of the PMOS transistors M7 and M8 are equal to each other, and the gate potentials are controlled to a potential at which the PMOS transistor M7 can pass current supplied from the current supply I3. Therefore, a gate-source voltage of the PMOS transistor M8 becomes larger than that of the PMOS transistor M7, and the potential at the coupling point of the PMOS transistor M8 and the current source I4 drops and, later, becomes almost the same as the internal power-supply line VDDA.

By the above operation, the PMOS transistor M3 is turned on, and the PMOS transistor M4 is turned off. Consequently, the output terminal T3 is short-circuited to the output terminal T1, and the voltage line VDDH is controlled to have the same potential as that of the power-supply voltage terminal VDD.

On the contrary, when the potential of the power-supply voltage terminal VDD is lower than that of the internal power-supply line VDDA, in the voltage comparator A2, the gate potentials of the PMOS transistors M5 and M6 are equal to each other, and the gate potentials are controlled to a potential at which the PMOS transistor M5 can pass current supplied from the current supply I1. Therefore, a gate-source voltage of the PMOS transistor M6 becomes larger than that of the PMOS transistor M5, and the potential at the coupling point of the PMOS transistor M6 and the current source I2 drops and, later, becomes almost the same as the internal power-supply line VDDA.

On the other hand, in the voltage comparator A3, the gate potentials of the PMOS transistors M7 and M8 are equal to each other, and the gate potentials are controlled to a potential at which the PMOS transistor M7 can pass current supplied from the current supply I3. Therefore, a gate-source voltage of the PMOS transistor M8 becomes smaller than that of the PMOS transistor M7, and the potential at the coupling point of the PMOS transistor M8 and the current source I4 drops and, later, becomes almost the same as the ground potential.

By the above operation, the PMOS transistor M3 is turned off, and the PMOS transistor M4 is turned on. Consequently, the output terminal T3 is short-circuited to the input terminal T2, and the voltage line VDDH is controlled to have the same potential as that of the power-supply voltage terminal VDD.

As a result, the substrate potential control circuit B1 can obtain the input/output characteristics shown in FIG. 4. Since the control signals S3 and S4 are generated by the voltage comparators A2 and A3, even in the case where the potential difference between the power-supply voltage terminal VDD and the internal power-supply line VDDA is small, the PMOS transistors M3 and M4 can be reliably controlled to be turned on/off.

Although the current supplies I1 to I4 are used in FIG. 7, alternatively, resistors or the like can be used.

<<Second Embodiment>>

Figure 8:
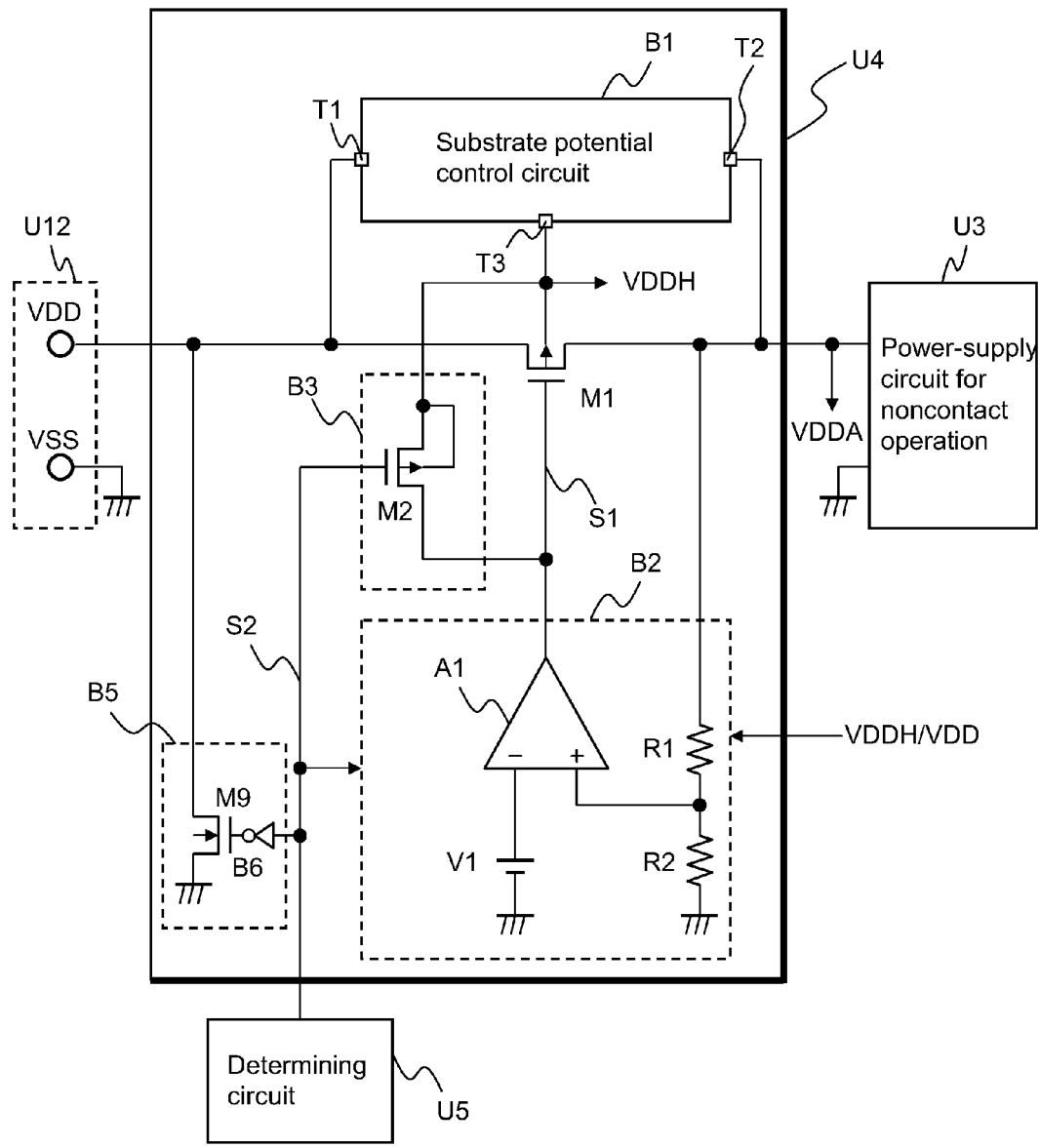
FIG. 8 is a basic configuration diagram showing another configuration of the power-supply voltage input control circuit U4 mounted on a semiconductor integrated circuit device of a second embodiment.

FIG. 8 is a basic configuration diagram showing another configuration of the power-supply voltage input control circuit U4 mounted on the semiconductor integrated circuit device of a second embodiment. To make explanation of the invention clear, the noncontact power-supply circuit U3 and the contact/noncontact determining circuit U5 mounted on the semiconductor integrated circuit device U2, and the power-supply voltage terminal VDD and the ground terminal VSS configuring the contact terminal U12 are shown.

In FIG. 8, the PMOS transistor M1 is coupled between the power-supply voltage terminal VDD and the internal power-supply line VDDA. To the substrate voltage of the PMOS transistor M1, the voltage line VDDH to which output voltage of the substrate potential control circuit B1 is supplied is coupled. To the gate terminal of the PMOS transistor M1, the control signal S1 generated by the voltage control circuit B2 and the pull-up circuit B3 is input. To the power-supply voltage terminal VDD, the pull-down circuit B5 controlled by the determination signal S2 is coupled.

The voltage control circuit B2 is configured by the following circuits. The voltage-dividing resistors R1 and R2 are provided between the internal power-supply line VDDA and the ground terminal VSS. A divided voltage obtained at the coupling point between the voltage-dividing resistors R1 and R2 is supplied to the non-inversion input (+) of the operating amplifier A1. The reference voltage supply V1 is coupled between the inversion input (−) of the operating amplifier A1 and the ground terminal VSS. The operation/non-operation of the voltage control circuit B2 is controlled by the determination signal S2 output from the contact/noncontact determining circuit U5. The operation is permitted in an operation in the contact mode instructed by the high level of the signal S2. The operation is stopped in an operation in the noncontact mode instructed by the low level of the signal S2.

With the configuration, only in an operation in the contact mode, the voltage control circuit B2 generates a voltage proportional to the difference between the divided voltage obtained at the coupling point between the voltage-dividing resistors R1 and R2 and the output voltage of the reference voltage supply V1, and outputs the voltage as the control signal S1.

On the other hand, the pull-up circuit B3 is configured by the PMOS transistor M2, and is on/off controlled by the determination signal S2 output from the contact/noncontact determining circuit U5. In an operation in the contact mode, the PMOS transistor M2 is turned off. In an operation in the noncontact mode, the PMOS transistor M2 is turned on.

A pull-down circuit 5 is configured by an inverter circuit B6 for inverting the determination signal and an N-channel-type MOS transistor (hereinbelow, also simply called NMOS transistor) M9, and is on/off controlled by the determination signal S2 output from the contact/noncontact determining circuit U5. In an operation in the contact mode, the NMOS transistor M9 is turned off. In an operation in the noncontact mode, the NMOS transistor M9 is turned on.

The power-supply voltage terminal VDD is coupled to the input terminal T1 of the substrate potential control circuit B1, the internal power-supply line VDDA is coupled to the input terminal T2, and the power-supply line VDDH is coupled to the output terminal T3.

As shown in FIG. 4, the substrate potential control circuit B1 is a circuit having the function of comparing the voltage level of the power-supply voltage terminal VDD coupled to the input terminal T1 with the power-supply line VDDA coupled to the input terminal T2, and outputting a voltage signal having a higher voltage level to the voltage line VDDH. Representatively, the circuit configurations shown in FIGS. 5 to 7 are applied.

With the function, the substrate potential control circuit B1 supplies a voltage having the same level as that of the source terminal to the substrate terminal of the PMOS transistor M1. The potentials at both ends of a parasitic diode formed between the substrate terminal and the source terminal of the PMOS transistor M1 are equalized, and a reverse bias is always applied to a parasitic diode formed between the substrate terminal and the drain terminal of the PMOS transistor M1, so that a current path is not formed between the power-supply voltage terminal VDD and the internal power-supply line VDDA, and the internal power-supply line VDDA can be completely interrupted from the power-supply voltage terminal VDD.

In the circuit configuration shown in FIG. 8, the operations in the parts in the state of operation using the contact terminal U12 (contact mode) are as follows.

In the case where voltage is applied across the power-supply voltage terminal VDD and the ground terminal VSS configuring the contact terminal U12, and electromagnetic waves from the outside are not supplied to the antenna L1, the contact/noncontact determining circuit U5 determines the contact mode, sets the determination signal S2 to the high level, and outputs the resultant signal.

The determination signal S2 is input to the pull-up circuit B3 and the voltage control circuit B2, the PMOS transistor M2 as a component of the pull-up circuit B3 is turned off, and the voltage control circuit B2 is controlled to operate. Consequently, the control signal S1 generated by the voltage control circuit B2 is supplied to the gate terminal of the PMOS transistor M1. At this time, the determination signal S2 is also input to the pull-down circuit B5. By the signal, the NMOS transistor M9 as a component of the pull-down circuit B5 is turned off. Consequently, no influence is exerted on the operation of the power-supply voltage input control circuit B1.

By the above operation, in an operation in the contact mode, the PMOS transistor M2 and the voltage control circuit B2 operate as a regulator circuit for suppressing the voltage of the internal power-supply line VDDA to a predetermined voltage value. Since the potential of the internal power-supply line VDDA becomes lower than that of the power-supply voltage terminal VDD, the potential at the substrate terminal of the PMOS transistor M1 is controlled to be the same as that of the power-supply voltage terminal VDD by the substrate potential control circuit B1.

In the circuit configuration shown in FIG. 8, the operations of the parts in the state of operation using the antenna L1 (noncontact mode) are as follows.

In the case where no voltage is applied across the power-supply voltage terminal VDD and the ground terminal VSS configuring the contact terminal U12 and electromagnetic waves from the outside are supplied to the antenna L1, the contact/noncontact determining circuit U5 determines the noncontact mode, sets the determination signal S2 to the low level, and outputs the resultant signal.

The determination signal S2 is input to the pull-up circuit B3 and the voltage control circuit B2 to stop the voltage control circuit B2 and turn on the PMOS transistor M2 configuring the pull-up circuit B3. Consequently, the potential of the gate terminal of the PMOS transistor M1 is controlled to be the same as that of the voltage line VDDH.

Further, the determination signal S2 is also input to the pull-down circuit B5, and the NMOS transistor M9 as a component of the pull-down circuit B5 is turned on, thereby passing current across the power-supply voltage terminal VDD and the ground terminal VSS, and the potential of the power-supply voltage terminal VDD is controlled to become equal to the ground potential.

By the operation, in an operation in the noncontact mode, the power-supply voltage terminal VDD can be fixed to the same potential as that of the ground terminal, and the potential of the internal power-supply line VDDA becomes larger than that of the power-supply voltage terminal VDD. Therefore, the gate terminal and the substrate terminal of the PMOS transistor M1 are maintained to be the same potential as that of the source terminal of the PMOS transistor M1, that is, the internal power-supply line VDDA while maintaining the state where the potentials of the gate terminal and the substrate terminal are equal to each other. Thus, the PMOS transistor M1 can maintain the off state, and the power-supply voltage terminal VDD and the internal power-supply line VDDA can maintain the completely isolated state.

Even if a voltage is applied across the power-supply voltage terminal VDD and the ground terminal VSS by the power supply capable of supplying current larger than current which can be passed by the NMOS transistor M9, regardless of the magnitude relation between the potential of the power-supply voltage terminal VDD and the potential of the internal power-supply line VDDA, while maintaining the state where the potential of the gate terminal and the potential of the substrate terminal of the PMOS transistor M1 are equal to each other, the potential is maintained equal to the potential of the source terminal of the PMOS transistor M1. Therefore, the PMOS transistor M1 maintains the off state, and the state where the power-supply voltage terminal VDD and the internal power-supply line VDDA are completely isolated from each other can be maintained. Even when a voltage which is large enough to switch the source terminal of the PMOS transistor M1 from the VDDA side to the VDD side is applied to the power-supply voltage terminal VDD, the state where the potential at the gate of the PMOS transistor M1 and the potential of the substrate are the same does not change. However, the possibility that the off state of the PMOS transistor M1 becomes unstable in a transient period in which the source terminal is switched cannot be completely eliminated. The stability is much higher than the configuration of FIG. 1 having no pull-down circuit B5.

As described above, by maintaining the substrate potential of the PMOS transistor M1 configuring the regulator circuit in the optimum state by the substrate potential control circuit B1 and switching the method of controlling the gate voltage of the PMOS transistor M1 in the operations in the contact mode and the noncontact mode, the PMOS transistor M1 is operated as a transistor for suppressing voltage as a component of the regulator circuit in the operation in the contact mode, thereby supplying a predetermined voltage to the internal power-supply line VDDA. In the operations in the noncontact mode, the PMOS transistor M1 can be operated as a switch transistor for isolating the power-supply voltage terminal VDD and the internal power-supply line VDDA.

With the configuration, as described above, the transistor as a component of the regulator circuit which is generally mounted can be used as the switch transistor realizing power supply isolation. Therefore, the transistor for isolation becomes unnecessary between the power-supply voltage terminal VDD and the internal power-supply line VDDA, so that increase in the chip area can be suppressed very much.

Further, also in the state where nothing is coupled to the power-supply voltage terminal VDD in the operation in the noncontact mode, the potential at the power-supply voltage terminal VDD is fixed to the ground potential by the pull-down circuit B5. Thus, more stable operation can be realized.

<<Third Embodiment>>

Figure 9:
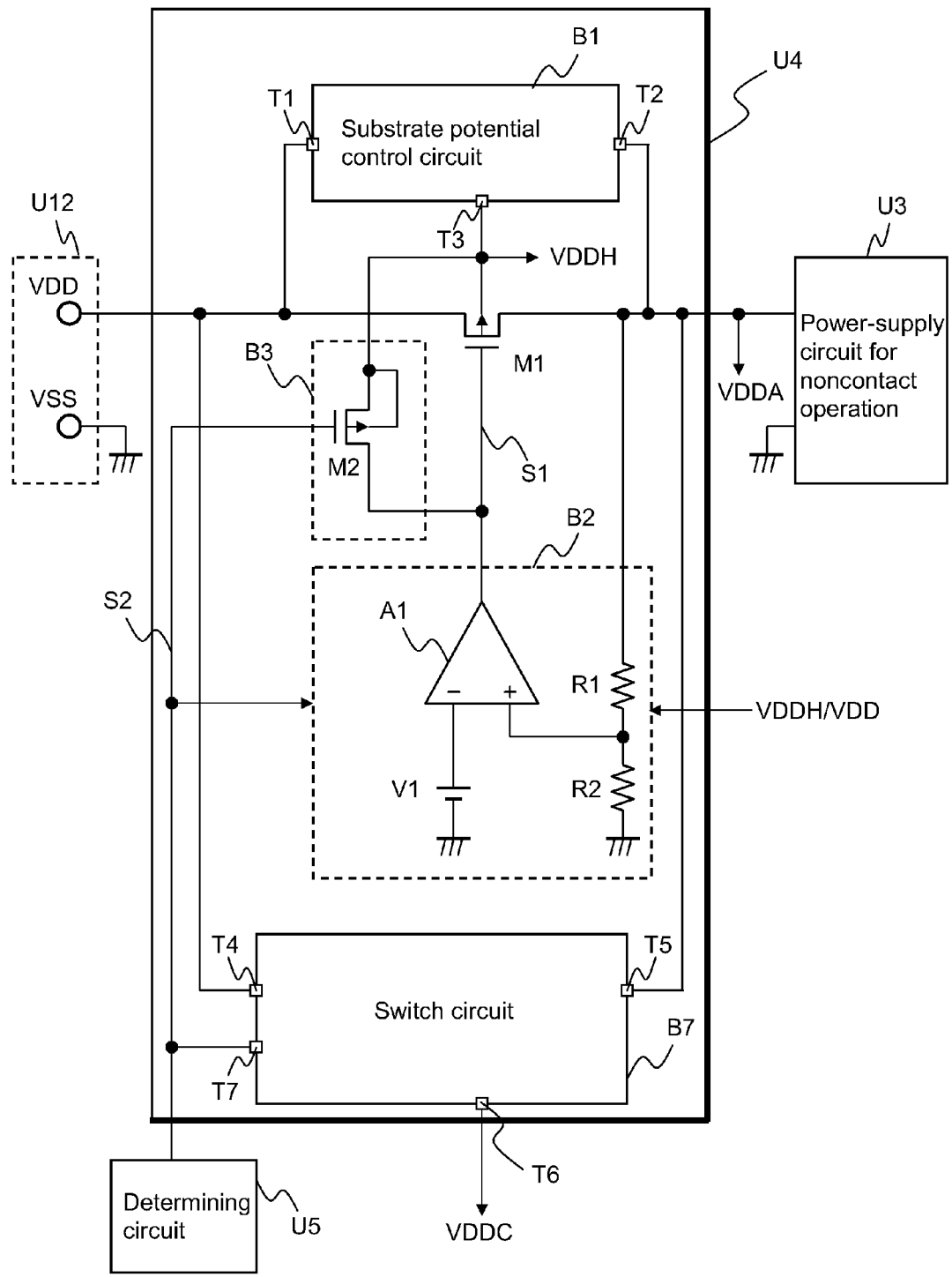
FIG. 9 is a basic configuration diagram showing another configuration of the power-supply voltage input control circuit U4 mounted on a semiconductor integrated circuit device of a third embodiment.

FIG. 9 is a basic configuration diagram showing another configuration of the power-supply voltage input control circuit U4 mounted on the semiconductor integrated circuit device of a third embodiment. To make explanation of the invention clear, the noncontact power-supply circuit U3 and the contact/noncontact determining circuit U5 mounted on the semiconductor integrated circuit device U2, and the power-supply voltage terminal VDD and the ground terminal VSS configuring the contact terminal U12 are shown.

In FIG. 9, the PMOS transistor M1 is coupled between the power-supply voltage terminal VDD and the internal power-supply line VDDA. To the substrate voltage of the PMOS transistor M1, the voltage line VDDH to which output voltage of the substrate potential control circuit B1 is supplied is coupled. To the gate terminal of the PMOS transistor M1, the control signal S1 generated by the voltage control circuit B2 and the pull-up circuit B3 is input.

The voltage control circuit B2 is configured by the following circuits. The voltage-dividing resistors R1 and R2 are provided between the internal power-supply line VDDA and the ground terminal VSS. A divided voltage obtained at the coupling point between the voltage-dividing resistors R1 and R2 is supplied to the non-inversion input (+) of the operating amplifier A1. The reference voltage supply V1 is coupled between the inversion input (−) of the operating amplifier A1 and the ground terminal VSS. The operation/non-operation of the voltage control circuit B2 is controlled by the determination signal S2 output from the contact/noncontact determining circuit U5. The operation is permitted in an operation in the contact mode instructed by the high level of the signal S2. The operation is stopped in an operation in the noncontact mode instructed by the low level of the signal S2.

With the configuration, only in an operation in the contact mode, the voltage control circuit B2 generates a voltage proportional to the difference between the divided voltage obtained at the coupling point between the voltage-dividing resistors R1 and R2 and the output voltage of the reference voltage supply V1, and outputs the voltage as the control signal S1.

The pull-up circuit B3 is configured by the PMOS transistor M2, and is on/off controlled by the determination signal S2 output from the contact/noncontact determining circuit U5. In an operation in the contact mode, the PMOS transistor M2 is turned off. In an operation in the noncontact mode, the PMOS transistor M2 is turned on.

The power-supply voltage terminal VDD is coupled to the input terminal T1 of the substrate potential control circuit B1, the internal power-supply line VDDA is coupled to the input terminal T2, and the power-supply line VDDH is coupled to the output terminal T3.

As shown in FIG. 4, the substrate potential control circuit B1 is a circuit having the function of comparing the voltage level of the power-supply voltage terminal VDD coupled to the input terminal T1 with the power-supply line VDDA coupled to the input terminal T2, and outputting a voltage signal having a higher voltage level to the voltage line VDDH. Representatively, the circuit configurations shown in FIGS. 5 to 7 are applied.

With the function, the substrate potential control circuit B1 supplies a voltage having the same level as that of the source terminal to the substrate terminal of the PMOS transistor M1. The potentials at both ends of a parasitic diode formed between the substrate terminal and the source terminal of the PMOS transistor M1 are equalized, and a reverse bias is always applied to a parasitic diode formed between the substrate terminal and the drain terminal of the PMOS transistor M1, so that a current path is not formed between the power-supply voltage terminal VDD and the internal power-supply line VDDA, and the internal power-supply line VDDA can be completely interrupted from the power-supply voltage terminal VDD.

Further, in the switch circuit B7, the power-supply voltage terminal VDD is coupled to an input terminal T4, the internal power-supply line VDDA is coupled to an input terminal T5, the voltage line VDDC is coupled to an output terminal T6, and the operation of the switch circuit B7 is controlled by the determination signal S2 coupled to the input terminal T7. With the configuration, in an operation in the contact mode, the voltage line VDDC is controlled to have the same potential as that of the power-supply voltage terminal VDD. In an operation in the noncontact mode, the voltage line VDDC is controlled to have the same potential as that of the internal power-supply line VDDA. An example of sing the voltage of the voltage line VDDC will be described later.

The operations of the switch circuit B7 in the state of operation using the contact terminal U12 (contact mode) in the circuit configuration shown in FIG. 9 are as follows.

In the case where voltage is applied across the power-supply voltage terminal VDD and the ground terminal VSS configuring the contact terminal U12, and electromagnetic waves from the outside are not supplied to the antenna L1, the contact/noncontact determining circuit U5 determines the contact mode, sets the determination signal S2 to the high level, and outputs the resultant signal.

The determination signal S2 is input to the pull-up circuit B3 and the voltage control circuit B2, the PMOS transistor M2 as a component of the pull-up circuit B3 is turned off, and the voltage control circuit B2 is controlled to operate. Consequently, the control signal S1 generated by the voltage control circuit B2 is supplied to the gate terminal of the PMOS transistor M1.

By the determination signal S2, the switch circuit B7 completely isolates the voltage line VDDC from the internal power-supply line VDDA, and controls the voltage line VDDC to the same potential as that of the power-supply voltage terminal VDD.

By the above operation, in an operation in the contact mode, the PMOS transistor M2 and the voltage control circuit B2 operate as a regulator circuit for suppressing the voltage of the internal power-supply line VDDA to a predetermined voltage value. Since the potential of the internal power-supply line VDDA becomes lower than that of the power-supply voltage terminal VDD, the potential at the substrate terminal of the PMOS transistor M1 is controlled to be the same as that of the power-supply voltage terminal VDD by the substrate potential control circuit B1.

In the circuit configuration shown in FIG. 9, the operations of the switch circuit B7 in the state of operation using the antenna L1 (noncontact mode) are as follows.

In the case where no voltage is applied across the power-supply voltage terminal VDD and the ground terminal VSS configuring the contact terminal U12 and electromagnetic waves from the outside are supplied to the antenna L1, the contact/noncontact determining circuit U5 determines the noncontact mode, sets the determination signal S2 to the low level, and outputs the resultant signal.

The determination signal S2 is input to the pull-up circuit B3 and the voltage control circuit B2 to stop the voltage control circuit B2 and turn on the PMOS transistor M2 configuring the pull-up circuit B3. Consequently, the potential of the gate terminal of the PMOS transistor M1 is controlled to be the same as that of the voltage line VDDH.

Consequently, in an operation in the noncontact mode, even if a voltage is applied across the power-supply voltage terminal VDD and the ground terminal VSS, regardless of the magnitude relation between the potential of the power-supply voltage terminal VDD and the potential of the internal power-supply line VDDA, while maintaining the state where the gate terminal and the substrate terminal of the PMOS transistor M1 are short-circuited, the potential is maintained equal to the potential of the source terminal of the PMOS transistor M1. Therefore, the PMOS transistor M1 maintains the off state, and the state where the power-supply voltage terminal VDD and the internal power-supply line VDDA are completely isolated from each other can be maintained.

By the determination signal S2, the switch circuit B7 completely isolates the voltage line VDDC from the power-supply voltage terminal VDD, and controls the voltage line VDDC to have the same potential as that of the internal power-supply line VDDA.

As described above, by maintaining the substrate potential of the PMOS transistor M1 configuring the regulator circuit in the optimum state by the substrate potential control circuit B1 and switching the method of controlling the gate voltage of the PMOS transistor M1 in the operations in the contact mode and the noncontact mode, the PMOS transistor M1 is operated as a transistor for suppressing voltage as a component of the regulator circuit in the operation in the contact mode, thereby supplying a predetermined voltage to the internal power-supply line VDDA. In the operations in the noncontact mode, the PMOS transistor M1 can be operated as a switch transistor for isolating the power-supply voltage terminal VDD and the internal power-supply line VDDA.

With the configuration, as described above, the transistor as a component of the regulator circuit which is generally mounted can be used as the switch transistor realizing power supply isolation. Therefore, the transistor for isolation becomes unnecessary between the power-supply voltage terminal VDD and the internal power-supply line VDDA, so that increase in the chip area can be suppressed very much.

The voltage line VDDC controlled as described above can be used as, for example, the power-supply voltage terminal of the reference voltage supply V1 configuring the voltage control circuit B2.

As an example, the operation voltage of the reference voltage supply V1 will be described. Preferably, the reference voltage supply V1 as a component of the voltage control circuit B2 supplies a power-supply voltage having the same potential as that of the power-supply voltage terminal VDD in an operation in the contact mode by the operation of the regulator circuit configured by the voltage control circuit B2 and the PMOS transistor M1.

On the other hand, considering that the reference voltage supply V1 is used in a noncontact regulator circuit or the like provided for the power-supply circuit U3 for noncontact operation in an operation in the noncontact mode, preferably, the reference power supply V1 uses the voltage generated between the internal power-supply line VDDA and the ground terminal VSS as a power-supply voltage. Therefore, the power-supply voltage terminal VDD completely isolated from the internal power-supply line VDDA in the noncontact mode cannot be used as the power-supply voltage of the reference voltage supply V1. That is, a reference voltage supply has to be provided separately for the power-supply circuit U3 for noncontact operation.

In consideration of the above, by providing the voltage line VDDC which is controlled to have the same potential as that of the power-supply voltage terminal VDD in an operation in the contact mode and is controlled to have the same potential as that of the internal power-supply line VDDA in an operation in the noncontact mode and making the reference voltage supply V1 operate on the voltage generated in the voltage line VDDC, without providing a plurality of reference voltage supplies, the reference voltage supply V1 is used in both of the contact and noncontact modes, and stable voltage generating operation can be realized.

Consequently, the power-supply voltage of a circuit whose operation voltage is desired to be changed between the contact mode and the noncontact mode like can be flexibly controlled like the reference voltage supply V1, and circuits having the same function can be commonly used. Therefore, increase in the chip area can be suppressed.

Further, in the case where characteristic adjustment data has to be stored in the memory U10 mounted on the semiconductor integrated circuit device U2 in an adjusting process before shipment of a chip in order to reduce a characteristic error, by coupling the voltage line VDDC to the power-supply voltage terminal of a circuit requiring characteristic adjustment and using it, circuits having the same function can be commonly used. It becomes unnecessary to perform the process of adjusting the circuit characteristic a plurality of times, and the chip cost can be also reduced.

Although the description has been given by paying attention to the power-supply voltage of the reference voltage supply V1, obviously, the voltage line VDDC can be used for other circuits and the like. However, in an operation in the contact mode, the circuit operates on voltage supplied from the power-supply voltage terminal VDD, so that withstand voltage and the like of a device has to be considered.

Figure 10:
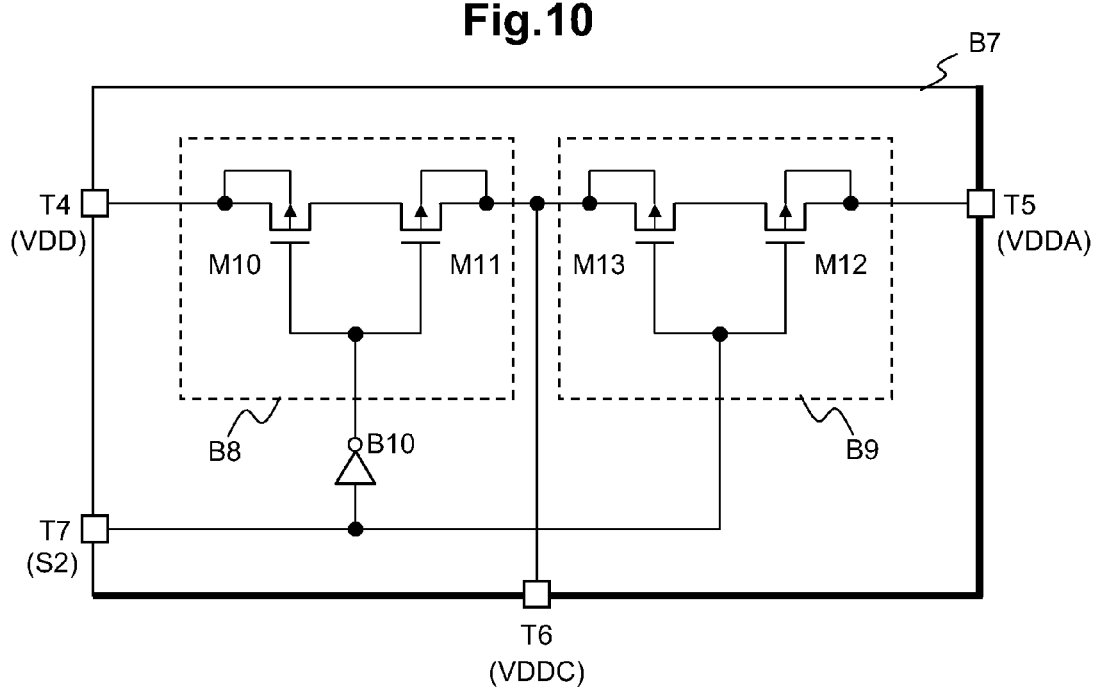
FIG. 10 is a circuit configuration diagram showing an example of a concrete configuration of a switch circuit B7 mounted on the semiconductor integrated circuit device of the third embodiment.

FIG. 10 is a circuit configuration diagram showing an example of a concrete configuration of the switch circuit B7 mounted on the semiconductor integrated circuit device of the third embodiment.

The switch circuit B7 shown in FIG. 10 is configured by switch basic circuits B8 and B9 and an inverter circuit B10.

In the switch basic circuit B8, PMOS transistors M10 and M11 are coupled in series between the input terminal T4 and the output terminal T6, the substrate terminal of the PMOS transistor M10 is coupled to the input terminal T4, the substrate terminal of the PMOS transistor M11 is coupled to the output terminal T6, and a signal obtained by inverting a voltage signal of the input terminal T7 by the inverter circuit B10 is input to the gate terminals of the PMOS transistors M10 and M11.

With the circuit configuration, a reverse bias is always supplied to one of a parasitic diode formed between the coupling point of the PMOS transistors M10 and M11 and the substrate terminal of the PMOS transistor M10 and a parasitic diode formed between the coupling point of the PMOS transistors M10 and M11 and the substrate terminal of the PMOS transistor M11, so that unnecessary current does not flow between the input terminal T4 and the output terminal T6.

In the switch basic circuit B9, PMOS transistors M12 and M13 are coupled in series between the input terminal T5 and the output terminal T6, the substrate terminal of the PMOS transistor M12 is coupled to the input terminal T5, the substrate terminal of the PMOS transistor M13 is coupled to the output terminal T6, and a voltage signal supplied to the input terminal T7 is input to the gate terminals of the PMOS transistors M12 and M13.

With the circuit configuration, a reverse bias is always supplied to one of a parasitic diode formed between the coupling point of the PMOS transistors M12 and M13 and the substrate terminal of the PMOS transistor M12 and a parasitic diode formed between the coupling point of the PMOS transistors M12 and M13 and the substrate terminal of the PMOS transistor M13, so that unnecessary current does not flow between the input terminal T5 and the output terminal T6.

As described above, in the power-supply voltage input control circuit U4 shown in FIG. 9, the power-supply voltage terminal VDD is coupled to the input terminal T4 of the switch circuit B7 configured by the two switch basic circuits B8 and B9 and the inverter circuit B10, the internal power-supply line VDDA is coupled to the input terminal T5, the voltage line VDDC is coupled to the output terminal T6, and the determination signal S2 is input to the input terminal T7.

When the determination signal S2 expresses the contact mode, the PMOS transistors M10 and M11 configuring the switch basic circuit B8 are turned on, and the PMOS transistors M12 and M13 configuring the switch basic circuit B9 are turned off. At this time, unnecessary current does not flow to a parasitic diode formed in the substrate terminal portion of the PMOS transistor, so that the voltage line VDDC is completely isolated from the internal power-supply line VDDA, and the voltage line VDDC is controlled to have the same potential as that of the power-supply voltage terminal VDD.

On the contrary, when the determination signal S2 expresses the noncontact mode, the PMOS transistors M10 and configuring the switch basic circuit B8 are turned off, and the PMOS transistors M12 and M13 configuring the switch basic circuit B9 are turned on. At this time, as described above, unnecessary current does not flow to the parasitic diode formed in the substrate terminal portion of the PMOS transistor, so that the voltage line VDDC is completely isolated from the power-supply voltage terminal VDD, and the voltage line VDDC is controlled to have the same potential as that of the internal power-supply line VDDA.

By controlling the switch circuit B7 by the determination signal S2 and selectively outputting the power-supply voltage terminal VDD or the internal power-supply line VDDA to the voltage line VDDC, the power-supply voltage of the circuit whose operation voltage is desired to be changed between the contact mode and the noncontact mode can be flexibly controlled, and circuits having the same function can be commonly used. Therefore, increase in the chip area can be suppressed.

The consumption current of the reference voltage supply V1 and the like can be decreased, so that the transistor size of the PMOS transistors M10 to M13 configuring the switch circuit B7 can be reduced, and the influence on the chip area is extremely small.

Figure 11:
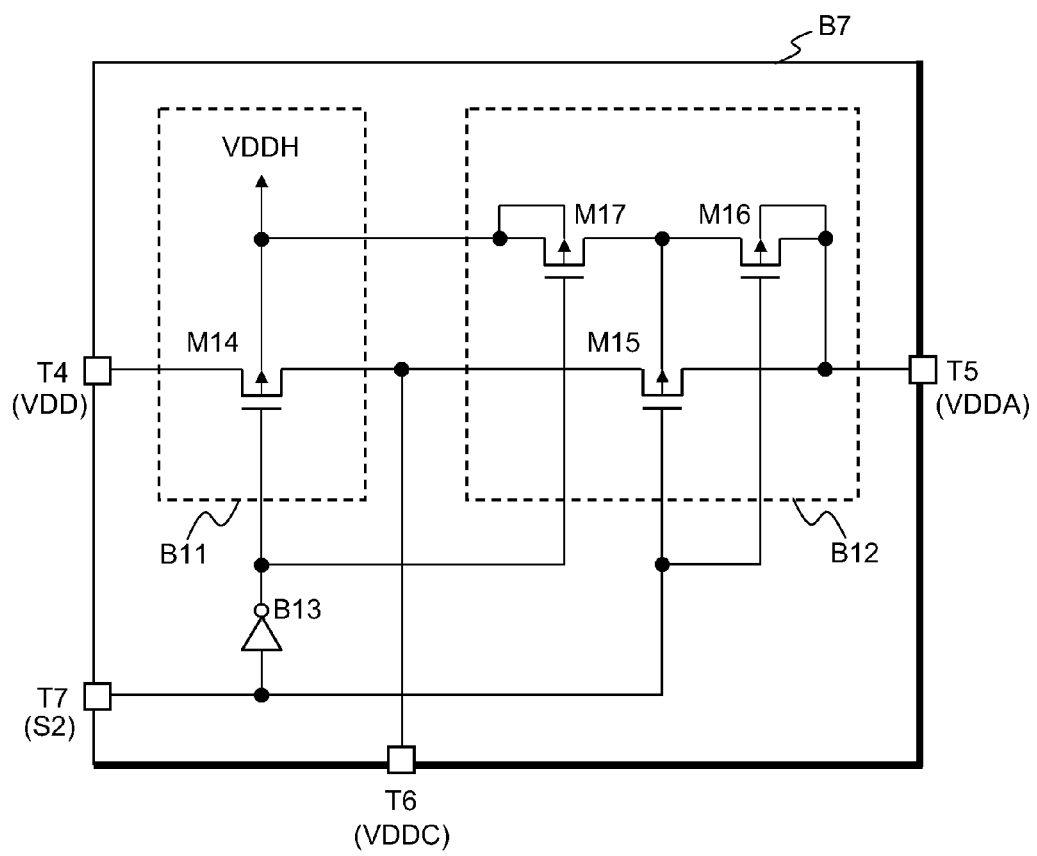
FIG. 11 is a circuit configuration diagram showing another concrete configuration of the switch circuit B7 mounted on the semiconductor integrated circuit device of the third embodiment.

FIG. 11 is a circuit configuration diagram showing another concrete configuration of the switch circuit B7 mounted on the semiconductor integrated circuit device of the third embodiment.

The switch circuit B7 shown in FIG. 11 is configured by switch basic circuits B11 and B12 and an inverter circuit B13.

In the switch basic circuit B11, a PMOS transistor M14 is coupled between the input terminal T4 and the output terminal T6, the substrate terminal of the PMOS transistor M14 is coupled to the voltage line VDDH of the power-supply voltage input control circuit U4, and a signal obtained by inverting a voltage signal of the input terminal T7 by the inverter circuit B13 is input to the gate terminal of the PMOS transistor M14.

With the circuit configuration, since the voltage line VDDH provided for the power-supply voltage input control circuit U4 has the same potential as the high potential side in the power-supply voltage terminal VDD and the internal power-supply line VDDA, a reverse bias is always supplied to a parasitic diode formed between the substrate terminal of the PMOS transistor M14 and the source or drain terminal of the PMOS transistor M14, so that unnecessary current does not flow between the input terminal T4 and the output terminal T6.

In the switch basic circuit B12, a PMOS transistor M15 is coupled between the input terminal T5 and the output terminal T6, the substrate terminal of the PMOS transistor M15 is coupled to the coupling point of PMOS transistors M16 and M17 coupled in series between the voltage line VDDH provided for the power-supply voltage input control circuit U4 and the input terminal T5, and the voltage signal which is input to the input terminal T7 is input to the gate terminal of the PMOS transistor M15. The substrate terminal of the PMOS transistor M16 is coupled to the input terminal T5, a voltage signal supplied to the input terminal T7 is input to the gate terminal of the PMOS transistor M16, the substrate terminal of the PMOS transistor M17 is coupled to the voltage line VDDH provided for the power-supply voltage input control circuit U4, and a signal obtained by inverting the voltage signal of the input terminal T7 by the inverter circuit B13 is input to the gate terminal of the PMOS transistor M17.

With the configuration, a forward bias is not supplied to a parasitic diode formed in the substrate terminals of the PMOS transistors M15 to M17, so that unnecessary current does not flow between the input terminal T5 and the output terminal T6.

As described above, in the power-supply voltage input control circuit U4 shown in FIG. 9, the power-supply voltage terminal VDD is coupled to the input terminal T4 of the switch circuit B7 configured by the two switch basic circuits B11 and B12 and the inverter circuit B13, the internal power-supply line VDDC is coupled to the input terminal T5, the voltage line VDDC is coupled to the output terminal T6, and the determination signal S2 is input to the input terminal T7.

When the determination signal S2 expresses the contact mode, the PMOS transistor M14 configuring the switch basic circuit B11 is turned on, and the PMOS transistor M15 configuring the switch basic circuit B12 is turned off. At this time, unnecessary current does not flow to a parasitic diode formed in the substrate terminal portion of the PMOS transistor, so that the voltage line VDDC is completely isolated from the internal power-supply line VDDA, and the voltage line VDDC is controlled to have the same potential as that of the power-supply voltage terminal VDD.

On the contrary, when the determination signal S2 expresses the noncontact mode, the PMOS transistor M14 configuring the switch basic circuit B11 is turned off, and the PMOS transistor M15 configuring the switch basic circuit B12 is turned on. At this time, as described above, unnecessary current does not flow to the parasitic diode formed in the substrate terminal portion of the PMOS transistor, so that the voltage line VDDC is completely isolated from the power-supply voltage terminal VDD, and the voltage line VDDC is controlled to have the same potential as that of the internal power-supply line VDDA.

By controlling the switch circuit B7 by the determination signal S2 and selectively outputting the power-supply voltage terminal VDD or the internal power-supply line VDDA to the voltage line VDDC, the power-supply voltage of the circuit whose operation voltage is desired to be changed between the contact mode and the noncontact mode can be flexibly controlled, and circuits having the same function can be commonly used. Therefore, increase in the chip area can be suppressed.

Further, since the switch basic circuit B11 can be configured by a single PMOS transistor and current steadily flows in the PMOS transistors M16 and M17 configuring the substrate terminal of the PMOS transistor M15 configuring the switch basic circuit B12, the size of the PMOS transistors M16 and M17 can be made smaller than that of the PMOS transistor M15. Thus, the area occupied by the PMOS transistors configuring the switch circuit B7 can be reduced.

The present invention achieved by the inventors herein has been described above on the basis of the embodiments. Obviously, the present invention is not limited to the foregoing embodiments but can be variously modified without departing from the gist. For example, the circuit configuration of the voltage control circuit B2 as a component of the power-supply voltage input control circuit U4 is not limited to that shown in FIG. 3 and the like. The function of the pull-up circuit B3 may be provided for the voltage control circuit B2. The pull-down circuit B5 shown in FIG. 8 may be applied to the power-supply voltage input control circuit U4 shown in FIG. 9. The substrate potential control circuit B1 may be a combination of the circuit configurations shown in FIGS. 5 and 6, or a combination of the circuit configurations shown in FIGS. 5 and 7.

The present invention is suitably applied to a semiconductor integrated circuit device having a plurality of power-supply input means and having the function of selecting an input power supply and operating on the selected power supply.

What is claimed is:

1. A semiconductor integrated circuit device comprising:
an antenna terminal coupled to an antenna;
a first power supply circuit for rectifying and smoothing an AC signal supplied from the antenna to the antenna terminal, thereby obtaining a DC voltage in a first power supply line;
a power supply terminal and a ground terminal to which power is supplied from the outside;
a second power supply circuit comprising a first MOS transistor disposed between the power supply terminal and the first power supply line and a voltage control circuit for controlling a voltage of a gate terminal of the first MOS transistor;
a substrate potential control circuit for controlling substrate voltage of the first MOS transistor; and
a second MOS transistor,
wherein in the case of using the voltage generated by the first power supply circuit as a power supply, the first MOS transistor is interrupted, thereby isolating the power supply terminal and the first power supply line from each other,
wherein in the case of using a power supply from an external terminal, the voltage control circuit controls the first MOS transistor to suppress voltages supplied from the power supply terminal and the ground terminal to a predetermined voltage and outputs the resultant voltage to the first power supply line,
wherein the second MOS transistor which substrate voltage and gate voltage of the first MOS transistor conductive in the case of using the voltage generated by the first power supply circuit as a power supply, and which makes the substrate voltage and the gate voltage nonconductive in the case of using a power supply from an external terminal, and
wherein the substrate potential control circuit outputs the voltage of the first power supply line as the substrate voltage in the state where the first MOS transistor is interrupted, and outputs the voltage of the first power supply terminal as the substrate voltage in a state where the first MOS transistor is not interrupted.

2. The semiconductor integrated circuit device according to claim 1,
wherein the substrate potential control circuit comprises: a third MOS transistor disposed between the output terminal of the substrate voltage and the power supply voltage; a fourth MOS transistor disposed between the output terminal of the substrate voltage and the first power supply line; and a gate voltage control circuit for controlling a gate terminal voltage of the third and fourth MOS transistors, and
wherein the gate voltage control circuit controls the substrate voltage of the first MOS transistor to be the same potential as the potential of the source terminal of the first MOS transistor by turning on the third MOS transistor when the potential of the power supply terminal is higher than that of the first power supply line, and turning on the fourth MOS transistor when the potential of the power supply terminal is lower than the potential of the first power supply line.

3. The semiconductor integrated circuit device according to claim 2,
wherein the third and fourth MOS transistors are P-channel-type MOS transistors in each of which a substrate has the same potential as that of an output terminal of the substrate voltage, and
wherein the gate voltage control circuit comprises a wire for coupling the gate of the third MOS transistor to the first power supply line, and a wire for coupling the gate of the fourth MOS transistor to the power supply terminal.

4. The semiconductor integrated circuit device according to claim 1, further comprising:

a pull-down circuit between the power supply terminal and the ground terminal; and a detection circuit which detects generation of a power supply based on an AC signal, wherein the pull-down circuit decreases a resistance value between the power supply terminal and the ground terminal on the basis of detection by a detection circuit, of formation of a power supply based on the AC signal.

5. The semiconductor integrated circuit device according to claim 4, wherein the detection circuit operates on voltage input to the substrate terminal of the first MOS transistor as a power supply voltage.

6. The semiconductor integrated circuit device according to claim 1, further comprising an internal circuit which operates on voltage supplied to the first power supply line as a power supply voltage.

7. An IC card comprising:

a coil forming an antenna;

a plurality of metal terminals forming a coupling terminal; and the semiconductor integrated circuit device according to claim 1, wherein an antenna terminal of the semiconductor integrated circuit device is coupled to the coil, and wherein a power supply terminal and a ground terminal of the semiconductor integrated circuit device are coupled to a predetermined metal terminal.

8. A semiconductor integrated circuit device comprising:

a first power supply circuit for rectifying and smoothing an AC signal supplied from an antenna to an antenna terminal, thereby obtaining a DC voltage in a first power supply line;

a second power supply circuit comprising a voltage control circuit for controlling gate terminal voltage of a first MOS transistor disposed between a power supply terminal to which power is input from the outside and the first power supply line;

a substrate potential control circuit for forming source voltage of the first MOS transistor as a substrate voltage; and a second MOS transistor which makes substrate voltage and gate voltage of the first MOS transistor conductive in the case of using the voltage generated by the first power supply circuit as a power supply, and which makes the substrate voltage and the gate voltage nonconductive in the case of using a power supply from an external terminal, wherein the substrate potential control circuit outputs the voltage of the first power supply line as the substrate voltage in a state where the first MOS transistor is interrupted, and outputs the voltage of the first power supply terminal as the substrate voltage in a state where the first MOS transistor is not interrupted.

9. The semiconductor integrated circuit device according to claim 8, wherein the substrate potential control circuit comprises: a third MOS transistor disposed between the output terminal of the substrate voltage and the power supply voltage; a fourth MOS transistor disposed between the output terminal of the substrate voltage and the first power supply line; and a gate voltage control circuit for controlling a gate terminal voltage of the third and fourth MOS transistors, and wherein the gate voltage control circuit controls the substrate voltage of the first MOS transistor to be the same potential as the potential of the source terminal of the first MOS transistor by turning on the third MOS transistor when the potential of the power supply terminal is higher than that of the first power supply line, and turning on the fourth MOS transistor when the potential of the power supply terminal is lower than the potential of the first power supply line.

10. The semiconductor integrated circuit device according to claim 9, wherein the third and fourth MOS transistors are P-channel-type MOS transistors in each of which a substrate has the same potential as that of an output terminal of the substrate voltage, and wherein the gate voltage control circuit comprises a wire for coupling the gate of the third MOS transistor to the first power supply line, and a wire for coupling the gate of the fourth MOS transistor to the power supply terminal.

11. An IC card comprising:

a coil forming an antenna;

a plurality of metal terminals forming a coupling terminal; and the semiconductor integrated circuit device according to claim 8, wherein an antenna terminal of the semiconductor integrated circuit device is coupled to the coil, and wherein a power supply terminal and a ground terminal of the semiconductor integrated circuit device are coupled to a predetermined metal terminal.

* * * * *